(12) United States Patent
Patel

(10) Patent No.: US 10,433,019 B2
(45) Date of Patent: Oct. 1, 2019

(54) SYSTEMS AND METHODS FOR ADAPTIVE STORAGE AND SCHEDULING OF MEDIA ASSETS

(71) Applicant: Rovi Guides, Inc., San Jose, CA (US)

(72) Inventor: Milan Indu Patel, Santa Clara, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/847,692

(22) Filed: Dec. 19, 2017

(65) Prior Publication Data

US 2019/0191221 A1  Jun. 20, 2019

(51) Int. Cl.
| | |
|---|---|
| *H04N 21/2747* | (2011.01) |
| *H04N 21/482* | (2011.01) |
| *H04N 21/239* | (2011.01) |
| *H04N 21/4728* | (2011.01) |
| *H04N 21/4335* | (2011.01) |
| *H04N 21/433* | (2011.01) |
| *H04N 21/8405* | (2011.01) |
| *H04N 21/458* | (2011.01) |
| *H04N 21/472* | (2011.01) |

(52) U.S. Cl.
CPC ..... *H04N 21/4825* (2013.01); *H04N 21/2393* (2013.01); *H04N 21/2747* (2013.01); *H04N 21/4334* (2013.01); *H04N 21/4335* (2013.01); *H04N 21/458* (2013.01); *H04N 21/4728* (2013.01); *H04N 21/47217* (2013.01); *H04N 21/8405* (2013.01)

(58) Field of Classification Search
CPC ......... H04N 21/2747; H04N 21/42209; H04N 21/4332

USPC .................................................. 725/93, 113
See application file for complete search history.

(56) References Cited

U.S. PATENT DOCUMENTS

| | | | |
|---|---|---|---|
| 6,239,794 B1 | 5/2001 | Yuen et al. | |
| 6,564,378 B1 | 5/2003 | Satterfield et al. | |
| 7,165,098 B1 | 1/2007 | Boyer et al. | |
| 7,394,967 B1 | 7/2008 | Potrebic et al. | |
| 7,761,892 B2 | 7/2010 | Ellis et al. | |
| 8,046,801 B2 | 10/2011 | Ellis et al. | |
| 8,332,895 B2 * | 12/2012 | Nathan ................ | G11B 19/025 725/61 |
| 9,418,366 B1 * | 8/2016 | Mayers ................. | G06Q 30/00 |
| 9,756,389 B2 | 9/2017 | Randall et al. | |
| 2002/0174430 A1 | 11/2002 | Ellis et al. | |
| 2005/0251827 A1 | 11/2005 | Ellis et al. | |
| 2006/0215991 A1 | 9/2006 | Larson et al. | |
| 2007/0277202 A1 | 11/2007 | Lin et al. | |
| 2008/0010118 A1 | 1/2008 | Howell et al. | |

(Continued)

*Primary Examiner* — Mulugeta Mengesha
*Assistant Examiner* — Franklin S Andramuno
(74) *Attorney, Agent, or Firm* — Haley Guiliano LLP

(57) ABSTRACT

Systems and methods are disclosed herein for adaptive storage and scheduling of media assets. A user may request a media guidance application, which may be implemented at a set-top box of user equipment, to record or store a series of media assets relating to a participant of interest. The media guidance application may forwardly record a first set of scheduled media assets relating to a participant of interest of a user and backwardly download a second set of stored media assets relating to the participant of interest from a cloud storage server to a local storage unit at user equipment, and then download the stored media assets for watching.

18 Claims, 10 Drawing Sheets

(56) References Cited

U.S. PATENT DOCUMENTS

| | | |
|---|---|---|
| 2008/0032797 A1 | 2/2008 | Harris et al. |
| 2009/0119328 A1* | 5/2009 | Raza ................ G06F 17/30884 |
| 2009/0142036 A1 | 6/2009 | Branam et al. |
| 2009/0187951 A1 | 7/2009 | McCarthy et al. |
| 2010/0153885 A1 | 6/2010 | Yates |
| 2011/0311205 A1 | 12/2011 | McClanahan et al. |
| 2013/0276022 A1 | 10/2013 | Tidwell |
| 2014/0130097 A1* | 5/2014 | Londero ............ H04N 5/44543 |
| | | 725/48 |
| 2014/0157319 A1* | 6/2014 | Kimura ................ H04N 21/252 |
| | | 725/46 |
| 2015/0341693 A1* | 11/2015 | Ishizuka ................ H04N 5/765 |
| | | 725/14 |
| 2015/0350709 A1 | 12/2015 | Tomita |
| 2016/0066040 A1 | 3/2016 | Webster et al. |
| 2017/0134778 A1 | 5/2017 | Christie et al. |
| 2017/0344624 A1* | 11/2017 | DeLuca ............ G06F 17/30601 |

\* cited by examiner

SYSTEMS AND METHODS FOR ADAPTIVE STORAGE AND SCHEDULING OF MEDIA ASSETS

BACKGROUND

Existing media systems can record media programs at a remote media server. For example, a user can record a sports game and store the recorded sports game on the remote media server. In this way, the user can utilize a much larger storage space than a local storage at a set-top box to record more programs. When the user wants to watch a recorded game, the user usually needs to find and download the recorded game from the cloud storage server to the local set-top box for playing back on a local user equipment. The constant search and download from the remote media server that the user needs to perform in order to playback and watch a stored media asset, can sometimes be inefficient, and thus lead to unsatisfactory user experience.

SUMMARY

Systems and methods are disclosed herein for adaptive storage and scheduling of media assets. Specifically, a media guidance application, implemented at user equipment, may be used to dynamically download previously stored media assets to local storage at user equipment for playing back to the user, based on user viewing progress of the media assets. The media guidance application may also forwardly store or record a set of scheduled media assets relating to a participant of interest of a user and backwardly download a set of previously stored media assets relating to a participant of interest from a cloud storage server to a local storage unit at user equipment.

The media guidance application may receive a user command indicating a participant of interest in an event, e.g., a sports event, a television drama series, etc. The event may include a plurality of instances scheduled for transmission as a plurality of scheduled media assets.

In some embodiments, in response to receiving the user command, the media guidance application may extract a descriptor from the user command indicating the participant of interest. The media guidance application may determine whether the descriptor identifies a name for the participant of interest, e.g., the user command may indicate the reigning champion in the event instead of identifying the name of the team. In response to determining that the descriptor does not identify the name for the participant of interest, the media guidance application may transmit a query based on the descriptor to a database. The media guidance application may then store, at the cloud storage server, a subset of media assets from the plurality of scheduled media assets at each time when a respective instance corresponding to each media asset from the subset of media assets is scheduled to be transmitted.

In some embodiments, the media guidance application may determine a type of the event, and the event evolvement rules associated with the type of the event. For example, the event may include, but not limited to a sports event, reality television show series, news program series, television show series, etc.

In some embodiments, the media guidance application may, in response to receiving the user command indicating the participant of interest in the event including the plurality of scheduled media assets, determine whether the user command includes a status requirement relating to the participant of interest. For example, a status requirement may include requiring the participant of interest to remain in the event.

In some embodiments, in response to determining that the user command includes a status requirement relating to the participant of interest, the media guidance application may receive a transmission schedule relating to a scheduled media asset from the plurality of scheduled media assets. The media guidance application may determine a status corresponding to the participant of interest based on the set of event evolvement rules, and determine whether the status corresponding to the participant of interest satisfies the status requirement relating to the participant of interest. For example, prior to recording a scheduled live game, the media guidance application may verify whether the scheduled live game involves the participant of interest.

In some embodiments, in response to determining that the status corresponding to the participant of interest satisfies the status requirement relating to the participant of interest, the media guidance application may store the scheduled media asset based on the transmission schedule.

The media guidance application may download, from the cloud storage server to the local storage of the user equipment, a media asset, from the subset of media assets. The media guidance application may generate, for display, an icon relating to the event, and the icon is selectable to play back the media asset. For example, the icon includes a link to the media asset stored at the local storage.

The media guidance application may determine whether the user has viewed a sufficient amount of the first media asset such that more media assets need to be downloaded. The media guidance application may determine one or more media assets to be downloaded from the subset of media assets based on the amount the user has viewed and content of the first media asset relating to the instance. For example, the media guidance application may determine whether the amount the user has viewed exceeds a pre-defined threshold amount. For another example, the media guidance application may identify whether the amount the user has watched is sufficient to indicate an outcome of the media asset. The media guidance application may determine a point of progression in the media asset corresponding to the amount the user has viewed, and determine, from metadata corresponding to the media asset within a period of time around the point of progression, a status indication relating to the participant of interest during the evolvement of the event. In response to determining that the status indication relating to the participant of interest is sufficient to indicate the outcome of the first instance based on the event evolvement rule, the media guidance application may determine that the amount the user has viewed exceeds the threshold amount, and more media assets are to be downloaded.

In some embodiments, in response to determining that the amount the user has viewed "enough" content of the media asset, the media guidance application may determine another instance subsequent to the instance based on an event schedule corresponding to the event, e.g., whether a round of 16 game is next to a group qualification game in a sports event.

In some embodiments, the media guidance application may obtain information relating to user viewing patterns from to a database of user viewing data. The media guidance application may determine the one or more media assets to be downloaded subsequent to the media asset based on viewing patterns of other users.

In some embodiments, the media guidance application may determine whether the subset of media assets includes any more media asset that has not been downloaded to the local storage at the user equipment. In response to determining that the subset of media assets includes no more media asset that has not been downloaded to the local storage at the user equipment, the media guidance application may determine another media asset that does not belong to the subset of media assets and has a highest download rate by other users among the plurality of scheduled media asset. The media guidance application may download the other media asset from the cloud storage server to the local storage of the user equipment. For example, when the participant of interest fails to enter the final game of a sports event, the media guidance application may determine whether a stored final game is available for downloading, as the final game has been download for the most times by other users.

In some embodiments, after downloading a media asset that does not involve the participant of interest, the media guidance application may determine whether the downloaded media asset is selected by the user within a pre-defined period of time. In response to determining that the third media asset is not selected by the user within the pre-defined period of time, the media guidance application may delete the other media asset from the local storage of the user equipment.

In some embodiments, in response to generating, for display, the icon relating to the event, the media guidance application may receive a user command to skip or fast forward the media asset. The media guidance application may generate, for display, a selectable icon to provide a reel view of the first media asset, and start downloading the one or more media assets.

In some embodiments, the media guidance application may automatically delete the entire series of the stored media assets in a batch. For example, the media guidance application may determine, from a data source, that a period of time has lapsed since the event is finished, e.g., from a news data source. The media guidance application may determine whether any media asset from the subset of media assets has been played during a past period of time. In response to determining that no media asset from the subset of media assets has been played during the past second period of time, the media guidance application may delete, in a batch, all media assets that belong to the subset of media assets from the local storage at the user equipment.

Embodiments described herein provides methods and systems for adaptively retrieving and storing media assets relating to a participant of interest in an event in response to a user request received during the event. The media guidance application may receive, at a first time instant, a first user command indicating a participant of interest in an event. The event includes a plurality of instances transmitted as a plurality of scheduled media assets. The media guidance application may identify, from the plurality of scheduled media assets, a first scheduled media asset involving the participant of interest that is scheduled for transmission at a second time later than the first time. The media guidance application may retrieve, at a time instant, an event schedule including available outcomes for instances from the plurality of instances that occurred before the time instant. For example, the event schedule may include available program listings for further instances, and the outcomes for past instances.

In some embodiments, the media guidance application may determine a type of the event, e.g., a sports event, a reality television, a drama television show, and/or the like. The media guidance application may retrieve a set of event evolvement rules based on the type of the event. The set of event evolvement rules indicate progression from a first instance to a second instance from the plurality of instances based on an outcome of the first instance during the event. For example, the event evolvement rules for a sports event specify the competition rule for a participant to advance from a qualification round, to quarter finals, semi-finals, and so on. The media guidance application may then determine, from the event schedule, whether the participant of interest remains in the event at the time instant based on the outcomes for the set of the plurality of instances and the set of event evolvement rules. For example, the media guidance application may form a query on the event schedule based on the participant of interest for future scheduled media assets, and may also retrieve outcomes of previous instances that the participant of interest has joined, and determine whether the participant of interest still remains in the sports event (e.g., by winning in the latest instance). In response to determining that the participant of interest remains in the event at the time instant, the media guidance application may schedule the first scheduled media asset for recording at the second time.

In some embodiments, the media guidance application may retrieve, at a third time instant later than the first time instant but before the time when the first media asset is scheduled for transmission, updated outcomes for instances that occurred after the first time instant and before the third time instant. The media guidance application may determine, from the updated event schedule, whether the participant of interest remains in the event at the third time based on the set of event evolvement rules. The media guidance application may then update the recording schedule depending on whether the participant of interest remains in the event at the third time instant.

In some embodiments, the media guidance application may, in response to determining that the participant of interest no longer remains in the event at the first time, determine a popular media asset to be downloaded instead. For example, the media guidance application may determine, from the event schedule, a second scheduled media asset from the plurality of scheduled media assets and a percentage of users who are recording one or more scheduled media assets and has chosen to record the second scheduled media asset. The media guidance application may determine whether the percentage exceeds a popularity threshold. In response to determining that the percentage exceeds the popularity threshold, the media guidance application may schedule for recording the second scheduled media asset when the second scheduled media asset is scheduled to be transmitted.

In some embodiments, the media guidance application may temporarily store the second scheduled media asset based on the configured recording schedule if no participant of interest is involved. For example, the media guidance application may determine that a period of time (e.g., seven days, eight days, etc.) has lapsed after the second scheduled media asset has been stored. The media guidance application may determine whether a stored copy of the second scheduled media asset has not been selected by the user for the period of time. In response to determining that the stored copy of the second scheduled media asset has not been selected by the user, the media guidance application may delete the stored copy of the second scheduled media asset from the local storage at the user equipment. The media guidance application may then generate, for display, a visual element corresponding to the second scheduled media asset and indicating that the second scheduled media asset has been deleted from the local storage at the user equipment.

In some embodiments, the media guidance application may search, a remote server (e.g., a cloud storage server), for a first set of previously stored media assets that involve the participant of interest and that correspond to a set of the plurality of instances that were transmitted as a set of the plurality of scheduled media assets before the first time. The media guidance application may then determine, based on the event schedule, a set of stored media assets, each relating to a respective instance involving the participant of interest and having a stored start time prior to the time instant when the user command to request storing media assets relating to the participant of interest is received. The media guidance application may download, from the cloud storage server to the local storage device at the user equipment, the set of previously stored media assets.

In some embodiments, the media guidance application may determine that the scheduled start time of the first scheduled media asset is prior to the time when the user command is received and a scheduled end time of the scheduled media asset is later than the time. The media guidance application may then partially store the scheduled media asset from the time. The media guidance application may then query whether a complete stored copy of the media asset is available, e.g., on the remote server. For example, the media guidance application may transmit a query to the cloud storage server for a stored copy of the scheduled media asset stored by other users. In response to determining that the stored copy of the scheduled media asset is available, the media guidance application may download, from the cloud storage server to the local storage device at the user equipment, the stored copy of the scheduled media asset. The media guidance application may delete the partially recorded first scheduled media asset.

The media guidance application may arrange the stored set of scheduled media assets and the set of previously stored media assets, e.g., under a directory indicative of the event, and arrange the media asset based on a respective transmission time corresponding to each respective media asset. The media guidance application may then generate, for display, an icon that indicates the event and is selectable to playback the arranged stored first set of scheduled media assets and the second set of stored media assets.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
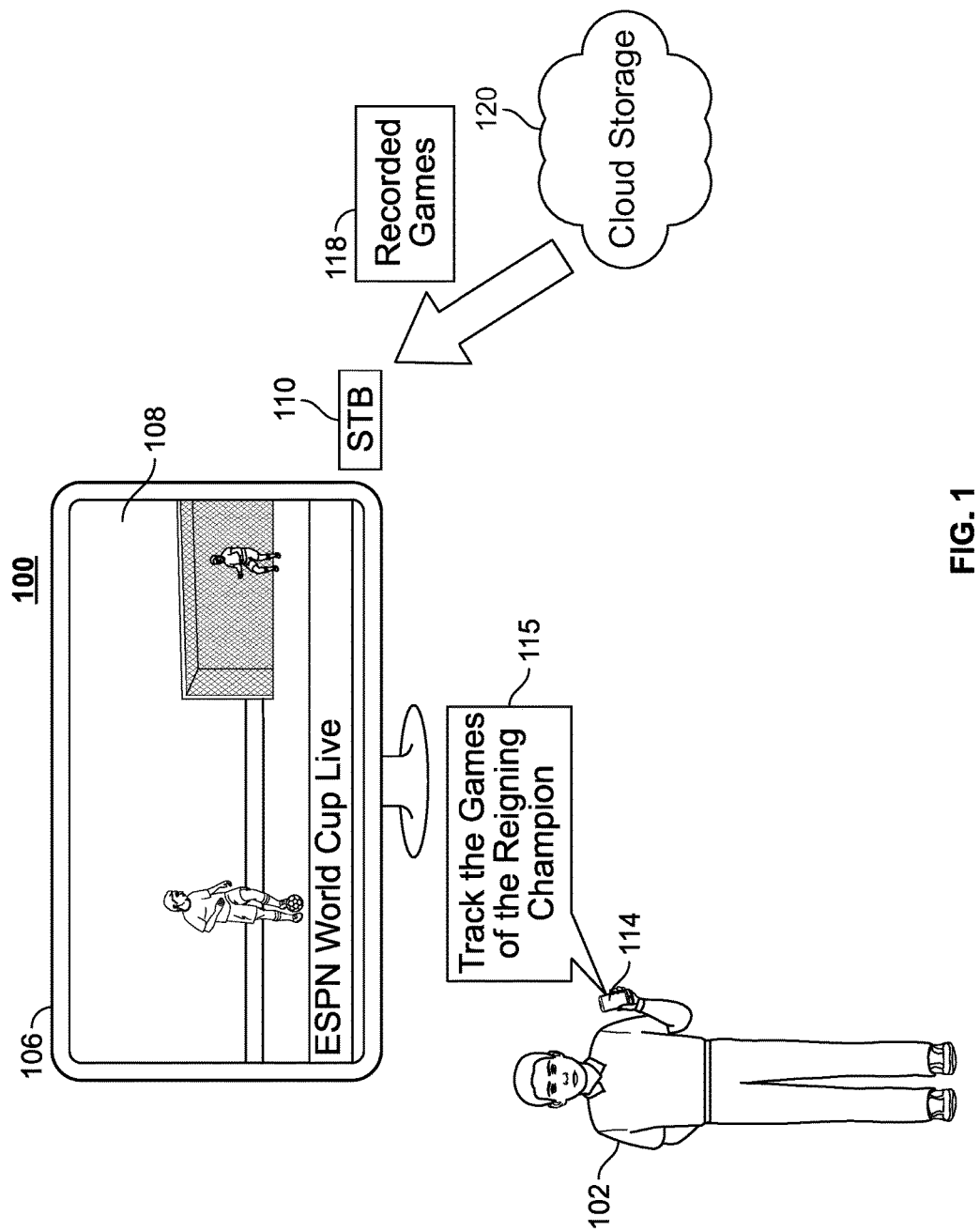
FIG. 1 depicts an illustrative diagram for automatically storing a set of scheduled media assets based on a user command, and then adaptively and progressively downloading the stored set of scheduled media assets from a cloud storage server to local storage at user equipment, in accordance with some embodiments of the disclosure.

Systems and methods are disclosed herein for adaptive storage and scheduling of media assets. For example, a user may request a media guidance application, which may be implemented at a set-top box of user equipment, to record or store a series of media assets, e.g., "all England games in the World Cup series." The media guidance application may determine that at the time when the user request is received, a few "England games" have already occurred. The media guidance application may then configure a recording schedule to forwardly record or store any future England games in the on-going World Cup event, and backwardly download the "England games" that have been previously stored by a cloud storage server to local storage at the user equipment. In this way, the media guidance application intelligently generates a complete set of media assets based on user interest, without the user having to manually find and download all the media assets of the missed instances, and user viewing experience is thus improved.

In some embodiments, upon recording or storing a series of media assets, a user may request to watch a series of previously stored media assets relating to the "World Cup,"

which may be stored on a cloud storage server to save storage space at the user equipment. Instead of manually downloading the stored media asset from the cloud storage server in a batch or one after another, the media guidance application may monitor the user's viewing progress, and progressively download media assets from the cloud storage server to local storage. For instance, when the user is close to finishing the first two games in the series, the media guidance application may automatically download the next two games in the series to the user equipment. In this way, the user no longer needs to manually download each stored media asset, and enjoys a seamless viewing experience of the series of previously stored media assets as the media guidance application is configured to always make unwatched media assets in the series available until the entire series has been watched. Also, as the media guidance application adaptively and progressively download media assets to the local storage, instead of downloading a large set of media assets in a batch, efficiency of the local storage space usage is thus enhanced.

As referred to herein, the term "event" refers to any media program that can be transmitted to and played on user equipment. For example, an event may include but not limited to a sports event, a reality television series, a television drama series, a news program, and/or the like. As referred to herein, the term "participant of interest" refers to an entity or incident that is featured in an event, which a user is interested in following. For example, a participant of interest may be a sports team, a sports player, a reality television personality, a character in television drama, a news incident in a news program, and/or the like. As used herein, the term "download" refers to transferring, via a communications network such as the Internet, electronic data from a network data source to a local device.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application, or any other data search tool that is configured to access the World Wide Web (www) and/or a databased of previously stored documents.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters" or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative diagram for automatically storing a set of scheduled media assets based on a user command, and then adaptively and progressively downloading the stored set of scheduled media assets from a cloud storage server to local storage at user equipment, in accordance with some embodiments of the disclosure. Diagram 100 shows a user 102 operating a user device 114, user equipment 106 which may be integrated with, or include a set-top box 110. The set-top box 110 may be configured to implement a media guidance application.

The media guidance application may receive a user command indicating a participant of interest in an event. The event may include a plurality of instances scheduled for transmission as a plurality of scheduled media assets. For example, the user 102 may submit a textual or a voice user command 115, via an input device (e.g., 510 in FIG. 5), or a communication interface (e.g., I/O path 502 in FIG. 5), e.g., "track the games of the reigning champion of the World Cup series." The World Cup series may include a number of games that has a program listing schedule available from a data source, e.g., data source 618 as described in relation to FIG. 6.

In some embodiments, in response to receiving the user command, the media guidance application may extract a descriptor from the user command indicating the participant of interest. For example, the media guidance application may extract key words "reigning champion," "World Cup" from the user command 115, and determines that the user 102 is interested in the participant who is the reigning champion in the event of World Cup. The media guidance application may determine whether the descriptor identifies a name for the participant of interest. For example, when the user command 115 says "tracking the England games in World Cup," the media guidance application may determine that the participant of interest, the England tea, is identified in the user command. For another example, when the user command 115 says "tracking the reigning champion in the World Cup" instead, the media guidance application may extract the descriptor "reigning champion" as indicative of a participant of interest, but the identity of the participant of interest is not disclosed by the user command 115.

In response to determining that the descriptor does not identify the name for the participant of interest, the media guidance application may transmit a query based on the descriptor to a database. For example, the media guidance application may transit a query based on "reigning champion" of the last World Cup in a database, e.g., at storage 508 as described in relation to FIG. 5, or data source 618 as described in relation to FIG. 6. In response to the query, the media guidance application may obtain an identifier or the name for the participant of interest, e.g., "Germany."

The media guidance application may then store, at the cloud storage server, a subset of media assets from the plurality of scheduled media assets at each time when a respective instance corresponding to each media asset from the subset of media assets is scheduled to be transmitted. For example, the media guidance application may automatically record all matches involving the German team in the World Cup program listing and store the recorded matches at the cloud storage server 120. The cloud storage server 120 may include, be part of, or host data source 616 and/or data source 618 as described in relation to FIG. 6.

In some embodiments, to dynamically store or record a scheduled media asset that involves the participant of interest, the media guidance application may apply an event evolvement rule. The media guidance application may determine a type of the event. For example, the event may include a variety of different types of events, such as, but not limited to a sports event (e.g., "NBA Final," "World Cup," "Olympics," etc.), reality television show series (e.g., "America's next top model," "the Bachelor," etc.), news program series (e.g., "presidential debate," "Anderson Cooper 360," etc.), television show series (e.g., "Game of Throne," etc.), etc. The media guidance application may retrieve a set of event evolvement rules based on the type of the event. For example, when the event relates to a sports event and reality shows with a competitive nature, the event evolvement rules may include a competition rule that prescribes how a participant of each instance (e.g., a game or an episode) may be eliminated from the series. For another example, when the event relates to a news program series or a television show, the event evolvement rules may include a stopping rule that prescribes how a participant of interest is terminated from the series, e.g., when a character of a show is removed from the storyline of the show, when a series of news stories on the participant of interest is complete, etc.

In some embodiments, the media guidance application may, in response to receiving the user command indicating the participant of interest in the event including the plurality of scheduled media assets, determine whether the user command includes a status requirement relating to the participant of interest. For example, when the user command 115 says "track all game of the reigning champion," the user command 115 includes an implicit status requirement for the reigning champion, e.g., the German team, to stay in the competition. For another example, when the user command says "record episodes including Benjen until he is dead," the user command includes a status requirement for the participant of interest, e.g., "Benjen" in Game of Thrones, to remain alive.

In some embodiments, in response to determining that the user command includes a status requirement relating to the participant of interest, the media guidance application may receive a transmission schedule relating to a scheduled media asset from the plurality of scheduled media assets. For example, the media guidance application may receive a scheduled time for a live game in World Cup, or a new episode for Game of Thrones, and/or the like. The media guidance application may determine a status corresponding to the participant of interest based on the set of event evolvement rules, and determine whether the status corresponding to the participant of interest satisfies the status requirement relating to the participant of interest. For example, prior to recording the scheduled live game or the new episode, the media guidance application may verify whether the scheduled live game involves the German team, or whether the character "Benjen" is still in the show. In some examples, the media guidance application may retrieve and utilize data from various data sources, such as but not limited to news feeds from websites, feeds from social media, user comments, etc., to obtain information relating to the status of a participant of interest in an ongoing event. Further details relating to using various data sources to obtain status information (e.g., a competition result) are described in co-pending and commonly owned U.S. non-provisional application Ser. No. 15/236,132, filed Aug. 12, 2016, which is hereby incorporated by reference herein in its entirety.

In some embodiments, in response to determining that the status corresponding to the participant of interest satisfies the status requirement relating to the participant of interest, the media guidance application may store the scheduled media asset based on the transmission schedule. For example, the media guidance application may record a game involving the German team, or a new episode of Game of Thrones at the cloud storage server 120. The cloud storage server 120 may include a personal account for the user, a shared account among several users, a public account sharable among subscribers among whom the recorded media assets may be shared, and/or the like.

The media guidance application may download, from the cloud storage server to the local storage of the user equipment, a media asset, from the subset of media assets. The media asset corresponds to an instance of the plurality of instances. For example, when the user 102 requests to watch the stored or recorded games or episodes, the media guidance application may move, e.g., via the communications network 614 described in relation to FIG. 6, the recorded games or episodes 118 from the cloud storage server 120 to local storage at the set-top box 110 so that the media guidance application can play back the game or episode 108 at the user equipment 106.

The media guidance application may generate, for display, an icon relating to the event, and the icon is selectable to play back the media asset. For example, the media guidance application may generate an icon "Available: World Cup Special" or "Available: Game of Thrones" at the user equipment 106. The user 102 may select the icon, e.g., via a user device 114, to play back the downloaded games or episodes. In some examples, the icon may include a link to a memory address at the local storage of the set-top box 110, and the memory address corresponds to a stored media asset that is to be played upon selecting the icon. In some examples, the downloaded media assets are arranged in a time order such that the earliest game or episode is automatically played when the icon is selected.

The media guidance application may determine that the user has viewed an amount of the first media asset. For example, the media guidance application may determine that the point of progression corresponding to the user viewing progress has reached a percentage (e.g., 75%, 80%, etc.) of the stored game or episode.

The media guidance application may determine one or more media assets to be downloaded from the subset of media assets based on the amount the user has viewed and content of the first media asset relating to the instance. A media asset from the one or more media assets includes another instance subsequent to the instance during evolvement of the event. For example, the media guidance application may determine whether the amount the user has viewed exceeds a threshold amount. The media guidance application may identify a point of progression in the media asset corresponding to the amount the user has viewed. The media guidance application may determine, from metadata corresponding to the media asset within a period of time around the point of progression, a status indication relating to the participant of interest during the evolvement of the event.

For example, the media guidance application may determine that the user has reached 32'33" of the entire 40-minute long game or episode, and may determine that whether the content the user has watched for the period of 32'33" is sufficient for the user to obtain information indicating whether the German team is eligible to enter another game, or the character "Benjen" is still active in the drama.

In some embodiments, to determine whether the user has watched "enough" amount of content, the media guidance application may compare the amount the user has watched with a pre-defined threshold (e.g., 75%, 80% of the entire game or episode). In other embodiments, the media guidance application may determine whether the status indication relating to the participant of interest is sufficient to indicate an outcome of the first instance based on an event evolvement rule. In response to determining that the status indication relating to the participant of interest is sufficient to indicate the outcome of the first instance based on the event evolvement rule, the media guidance application may determine that the amount the user has viewed exceeds the threshold amount. For example, the media guidance application may identify the status indication from a subtitle corresponding to the media asset, e.g., the subtitle of an episode from "Game of Thrones" may indicate information such as "Benjen is dead," "We lost Benjen," etc., indicating the status of character "Benjen" is likely to be "dead" at the time of the point of progression. For another example, the media guidance application may generate a screen image from the first media asset and identifying the status indication within the screen image, e.g., the score of a soccer game is usually displayed at certain position within the video frame. When the media guidance application detects that the displayed score matches the final score of the respective game, which is obtained and stored from a data source, the media guidance application may determine that the user has watched "enough" of the stored media asset. Or alternatively, the media guidance application may transmit, to a user interactive cloud platform, a query based on the participant of interest. For example, the media guidance application may receive user comments from a social media platform, e.g., user comments in response to watching a soccer game involving the German team, which may indicate the time for each goal. Thus, when the media guidance application determines that the user has passed the times for goals, the media guidance application may determine that the user has watched "enough" of the stored media asset.

In some embodiments, in response to determining that the amount the user has viewed "enough" content of the media asset, the media guidance application may determine what the user may watch next. Specifically, the media guidance application may determine another instance subsequent to the instance based on an event schedule corresponding to the event. For example, after watching a quarter final game in the World Cup, the media guidance application may determine media assets including a semi-final game for the user to watch, if the participant of interest, e.g., the German team, has made it to the semi-final. For another example, after watching all stored episodes involving the character "Benjen" from season I of Game of Thrones, the media guidance application may determine media assets from the next season for the user to watch. In this way, the media guidance application may determine the one or more media assets that feature the other instance based on metadata corresponding to the one or more media assets.

In some embodiments, the media guidance application may obtain information relating to user viewing patterns from to a database of user viewing data. The media guidance application may determine the one or more media assets to be downloaded subsequent to the media asset based on viewing patterns of other users. For example, the media guidance application may determine that for similar stored media assets, e.g., games from World Cup, other users usually watch the stored games one after another. The media guidance application may then download a new media asset one at a time. For another example, the media guidance application may determine that other users usually watch episodes 5-7 in a batch after watching episode 4 of Game of Thrones, the media guidance application may then download stored episodes 5-7 when the user is approaching the end of episode 4.

In some embodiments, the media guidance application may determine whether the subset of media assets includes any more media asset that has not been downloaded to the local storage at the user equipment. In response to determining that the subset of media assets includes no more media asset that has not been downloaded to the local storage at the user equipment, the media guidance application may determine another media asset that does not belong to the subset of media assets and has a highest download rate by other users among the plurality of scheduled media asset. The media guidance application may download the other media asset from the cloud storage server to the local storage of the user equipment. For example, when the user is interested in downloading stored games involving the German team but the German team does not make it to the final game, the media guidance application may determine whether a stored final game is available for downloading, as the final game may be the most popular in the World Cup series, and download the stored final game for the user.

In some embodiments, the media guidance application may temporarily keep the downloaded media asset at the local storage if the downloaded media asset does not correspond to the participant of interest. Specifically, the media guidance application may determine whether the downloaded media asset is selected by the user within a pre-defined period of time. In response to determining that the third media asset is not selected by the user within the pre-defined period of time, the media guidance application may delete the other media asset from the local storage of the user equipment. For example, when the media guidance application has downloaded the stored final game of the World Cup series, even if the stored final games does not involve the German team, but the user has not watched the stored final game for at least a week, the media guidance application may automatically delete the stored final game at the local storage to save storage space.

In some embodiments, in response to generating, for display, the icon relating to the event, the media guidance application may receive a user command to skip or fast forward the media asset. The media guidance application may generate, for display, a selectable icon to provide a reel view of the first media asset, and start downloading the one or more media assets. For example, the media guidance application may determine a point of progression when the user command to skip or fast forward is received, and generate a summary reel view of the rest of the media asset from the point of progression.

In some embodiments, the media guidance application may automatically delete the entire series of the stored media assets in a batch, without the user having to manually delete each media asset. Specifically, the media guidance application may determine, from a data source, that a period of time has lapsed since the event is finished. For example, the media guidance application may delete the stored media asset after the season of the event is over, e.g., two months (or other periods of time) after the event is completed. The media guidance application may obtain information relating to the conclusion of the event, e.g., end of the World Cup, completion of an ongoing season of Game of Thrones, etc., from various data sources, e.g., data source 618 described in relation to FIG. 6. The media guidance application may determine whether any media asset from the subset of media assets has been played during a past period of time. For example, the media guidance application may delete the stored media assets if none of the stored media assets has been played for a period of time, e.g., for the past month, two weeks, three weeks, etc. In response to determining that no media asset from the subset of media assets has been played during the past second period of time, the media guidance application may delete, in a batch, all media assets that belong to the subset of media assets from the local storage at the user equipment. An example interface to delete the stored media assets is shown at screen 133 in relation to FIG. 2

Figure 2:
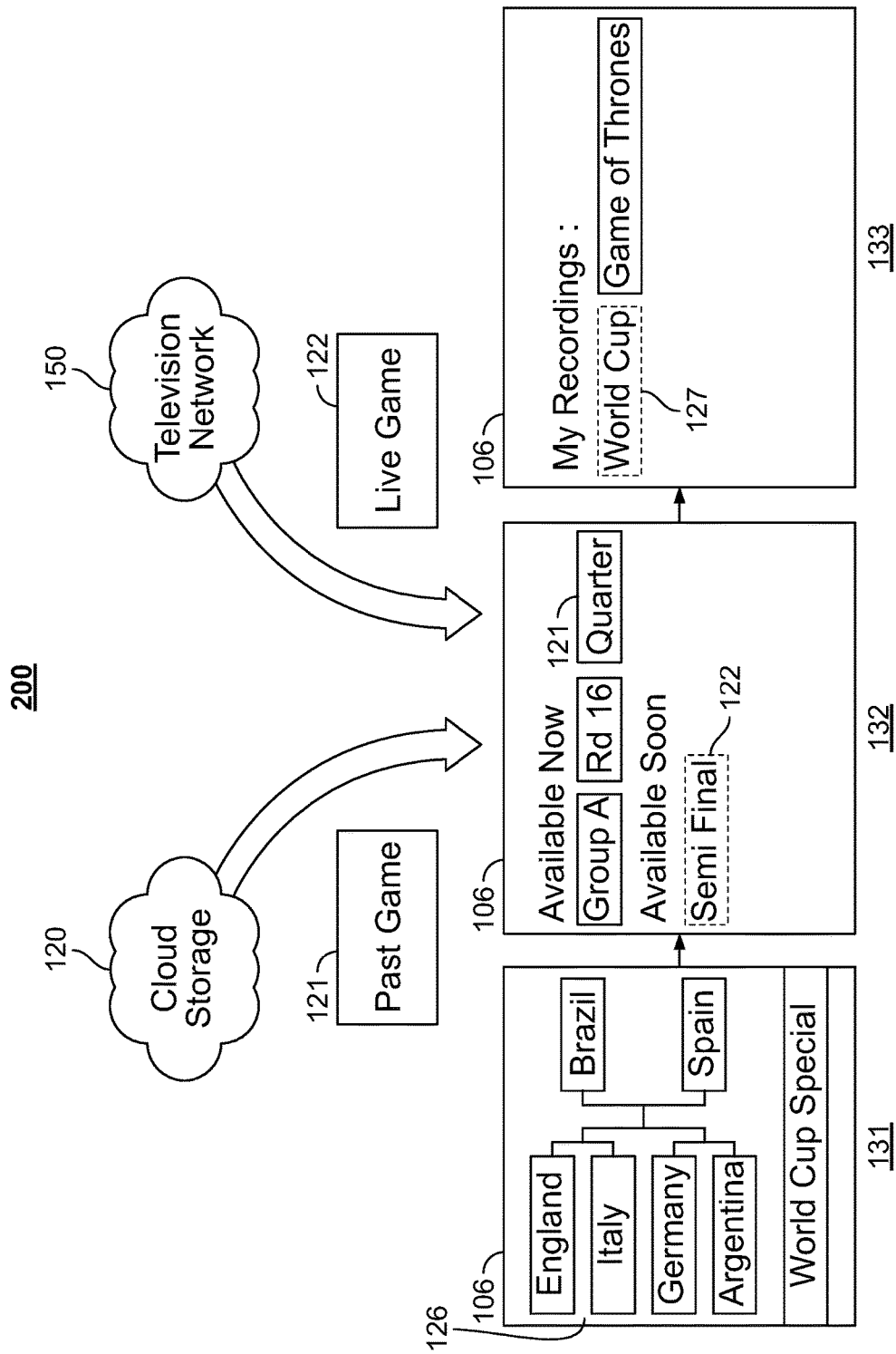
FIG. 2 depicts an illustrative diagram for adaptively retrieving and storing media assets relating to a participant of interest in an event in response to a user request received during the event based on the time when a user command is received, in accordance with some embodiments of the disclosure.

FIG. 2 depicts an illustrative diagram for adaptively retrieving and storing media assets relating to a participant of interest in an event in response to a user request received during the event based on the time when a user command is received, in accordance with some embodiments of the disclosure. Diagram 200 shows user equipment 106 (similar to the user equipment 106 in FIG. 1) that is configured to receive data transmission from a cloud storage server 120, a television network 150, and/or the like, e.g., via the communications network 614 described in relation to FIG. 6. The media guidance application may receive a user command to record media assets corresponding to a participant of interest in an event, at a first time instant, after the event has started. For example, a user may send a request to record games involving the German team in the World Cup at a time during the course of the World Cup. The media guidance application may then identify, from the plurality of scheduled media assets, a first scheduled media asset involving the participant of interest that is scheduled for transmission at a second time later than the first time. The media guidance application may retrieve, at a time instant, an event schedule including available outcomes for instances from the plurality of instances that occurred before the time instant. For example, the media guidance application may obtain an event schedule relating to the World Cup, when the event is still ongoing. The event schedule may include available program listings for further instances (e.g., games, etc.), and the outcomes (e.g., the score of each game) for past instances. The media guidance application may obtain the event schedule as part of the metadata of media assets transmitted from the television network 150. For another example, the media guidance application may obtain the event schedule from various data source, e.g., data source 618 as described in relation to FIG. 6. For another example, if the event schedule is not readily available, the media guidance application may transmit a query to the television network 150 for media assets relating to past games and future games relating to the participant of interest.

In some embodiments, for example, as shown at screen 131 in FIG. 2, the media guidance application may display the event schedule, e.g., a World Cup bracket 126, at user equipment. A user may indicate a participant of interest by selecting a team on the bracket 126, or via a voice command 115, as shown in FIG. 1. For another example, the media guidance application may illustrate to the user, via the bracket 126, which games are backwardly downloaded in response to receiving the user command indicating a participant of interest. For instance, when a user is watching a final game, and submits a user command indicating a participant of interest, e.g., the German team, the media guidance application may download all games involving the German team and illustrate in the bracket 126 with a visualization effect, e.g., with a different color, patterns, etc., to show which games are downloaded.

In some embodiments, the media guidance application may determine, from the event schedule, whether the participant of interest remains in the event at the first time instant when the user command is received, based on the set of event evolution rules and outcomes of past instances involving the participant of interest. For example, the media guidance application may form a query on the event schedule based on the participant of interest for future scheduled media assets. In some embodiments, the media guidance application may retrieve outcomes of previous instances that the participant of interest has joined, and determine whether the participant of interest still remains in the sports event (e.g., by winning in the latest instance). In response to determining that the participant of interest remains in the event at the time instant, the media guidance application may identify the scheduled media asset, e.g., the time for the next game involving the German team, a next episode of Game of Thrones, etc. The media guidance application may monitor an outcome corresponding to the scheduled media asset to update the event schedule. For example, the media guidance application may update the event schedule based on the outcome of the scheduled media asset when the scheduled media asset is finished playing, e.g., in the qualification of the World Cup, the outcome of a game involving the German team may likely affect the schedule of other scheduled games in the same group. Further detail relating to updating a competition result is described in co-pending and commonly owned U.S. nonprovisional application Ser. No. 15/236,132, filed Aug. 12, 2016, which is hereby incorporated by reference herein in its entirety.

In some embodiments, the media guidance application may retrieve, at a third time instant later than the first time instant but before the second time instant when the first media asset is scheduled for transmission, an updated event schedule including updated outcomes for instances that occurred after the first time instant and before the second time instant, e.g., from data source 618 as described in relation to FIG. 6. The media guidance application may determine, from the updated event schedule, whether the participant of interest remains in the event at the second time based on the set of event evolution rules. For example, in the qualification of the World Cup, the outcome of a game involving the German team may indicate whether the German team can escalate to the Round of 16 based on the group qualification rule of the World Cup. The media guidance application may update the recording schedule depending on whether the participant of interest remains in the event at the third time instant.

In some embodiments, the media guidance application may, in response to determining that the participant of interest no longer remains in the event at the first time instant, determine, from the event schedule, a second scheduled media asset from the plurality of scheduled media assets and a percentage of users who are recording one or more scheduled media assets and has chosen to record the second scheduled media asset. For example, when the media guidance application determines that the German team is no longer in the World Cup series, the media guidance application may identify that the World Cup final game has been scheduled for storing or recording by other users. For another example, the media guidance application may identify that other users have scheduled to store or record the season finale of Game of Thrones, when the character "Benjen" is no longer alive in the current season. The media guidance application may determine whether the percentage exceeds a popularity threshold (e.g., 20%, 25%, etc.). In response to determining that the percentage exceeds the popularity threshold, the media guidance application may schedule for storage the second scheduled media asset, e.g., the World Cup final or the Game of Thrones season finale.

In some embodiments, the media guidance application may record or store the second scheduled media asset based on the recording schedule. The media guidance application may determine that a period of time, e.g., two weeks, three weeks, has lapsed after the second scheduled media asset has been stored. The media guidance application may determine whether a stored copy of the second scheduled media asset has not been selected by the user. In response to determining that the stored copy of the second scheduled media asset has not been selected by the user, the media guidance application may delete the stored copy of the second scheduled media asset from the local storage at the user equipment. The media guidance application may then generate, for display, a visual element corresponding to the second scheduled media asset and indicating that the second scheduled media asset has been deleted from the local storage at the user equipment. In some embodiments, a user may select the visual element to request the deleted second media asset, which may be downloaded again from a remote server to the local storage device at the user equipment.

The media guidance application may configure a recording schedule to store a set of scheduled media assets when the scheduled media asset is transmitted after the time instant. For example, when a live game 122 is transmitted from the television network 150, the live game 122 may be stored at user equipment 106. Before the scheduled time, e.g., the second time instant, for the scheduled media asset is transmitted, the media guidance application may generate, for display, an icon with a visual effect to show that the schedule media asset is to be available at the scheduled transmission time, e.g., the semi-final game 122 is "available soon." The media guidance application may determine, based on the event schedule, a set of previously stored media assets, each relating to a respective instance involving the participant of interest and having a stored start time prior to the time instant when the user command to request storing media assets relating to the participant of interest is received.

In response to the user command received at the first time instant after the event has started, the media guidance application may also retroactively retrieve previously stored media assets that involve the participant of interest. Specifically, the media guidance application may search, the cloud storage server, for a first set of previously stored media assets that involve the participant of interest and that correspond to a set of the plurality of instances that were transmitted as a set of the plurality of scheduled media assets before the first time. For example, the media guidance application may search, among previously recorded World Cup games, for games that occurred before the first time instant. The media guidance application may then retrieve outcomes for the set of the plurality of instances, and determine, based on the retrieved outcomes, a second set of previously stored media assets from the first set of previously stored media assets. Each previously stored media asset in the second set corresponds to a given one of the plurality of instances associated with an outcome that corresponds to a threshold. For example, the media guidance application may find a subset of games within the games that occurred before the first time instant, and each games from the subset of games has a score greater than a pre-defined threshold, which indicates that the German team is the winner of the respective game. The media guidance application may download, from the cloud storage server 120 to the local storage unit at the user equipment 106, the set of stored media assets, e.g., past games 121 involving the German team in the World Cup.

For example, in some embodiments, as shown at screen 132 in FIG. 2, after downloading past games involving the German team, the media guidance application may display a series of icons of the downloaded and currently available games 121 at user equipment 106, and an icon displayed with a visualization effect, e.g., grayed-out, shaded, etc., for a scheduled media asset 122 that is not transmitted yet but scheduled to be stored and made available.

In some embodiments, the media guidance application may determine that the scheduled start time of the first scheduled media asset is prior to the time when the user command is received and a scheduled end time of the scheduled media asset is later than the time. For example, at the time when the user sends a user command to record or store media assets relating to the German team or the character "Benjen," the media guidance application may determine that a scheduled media asset, e.g., a live game 122, or an episode is being transmitted or played. The media guidance application may partially store the scheduled media asset from the time. The media guidance application may then query whether a complete store copy of the media asset is available. Specifically, the media guidance application may transmit a query to the cloud storage server 120 for a stored copy of the scheduled media asset stored by other users. In response to determining that the stored copy of the scheduled media asset is available, the media guidance application may download, from the cloud storage server 120 to the local storage at the user equipment 106, the stored copy of the scheduled media asset. The media guidance application may delete the partially stored first scheduled media asset.

The media guidance application may arrange the stored set of scheduled media assets, e.g., downloaded from cloud storage server 120, and the set of previously stored media assets, e.g., stored from the television network 150 when the scheduled media asset is being played. For example, the media guidance application may arrange the media assets under a directory indicative of the event, and arrange the media asset based on the event schedule based on a respective transmission time corresponding to each respective media asset. For example, in one implementation, the media assets, including the recorded media assets and retrieved previously stored media assets, may be arranged in a time sequence based on a respective transmission time corresponding to each respective media asset, e.g., episode one, episode two, and so on, for a drama series show. For another example, in one implementation, the media assets may be arranged under sub-directories based on the event schedule, e.g., the qualification games, round of sixteen games, quarter final games, semi-final game(s), and/or the like. The media guidance application may then generate, for display, an icon that indicates the event and is selectable to playback the arranged stored first set of scheduled media assets and the second set of stored media assets.

In some embodiments, as described in relation to FIG. 1, the media guidance application may automatically delete media assets in a batch when the related event has lapsed for a period of time. For example, the media guidance application may display the icon for media assets to be deleted, e.g., the World Cup series 127, with a special visual effect, e.g., grayed-out, shaded, etc. to notify a user that the series is to be automatically deleted. In some embodiments, the user may select the "World Cup series" icon 127 to reactive the series so that the series will not be deleted. If the World Cup event has lapsed for a period of time, and the user did not act to the grayed icon 127, the media guidance application may delete the "World Cup" series. In some embodiments, the media guidance application may generate, for display, an icon with a visual effect (e.g., see 127 that is grayed-out, shaded, etc.) to indicate one or more media assets, or an entire series have been deleted from the local storage at the user equipment. When the media guidance application receives a user selection on the icon showing deleted media assets, the media guidance application may send a request to download the media assets from the cloud storage server 120 again.

Figure 3:
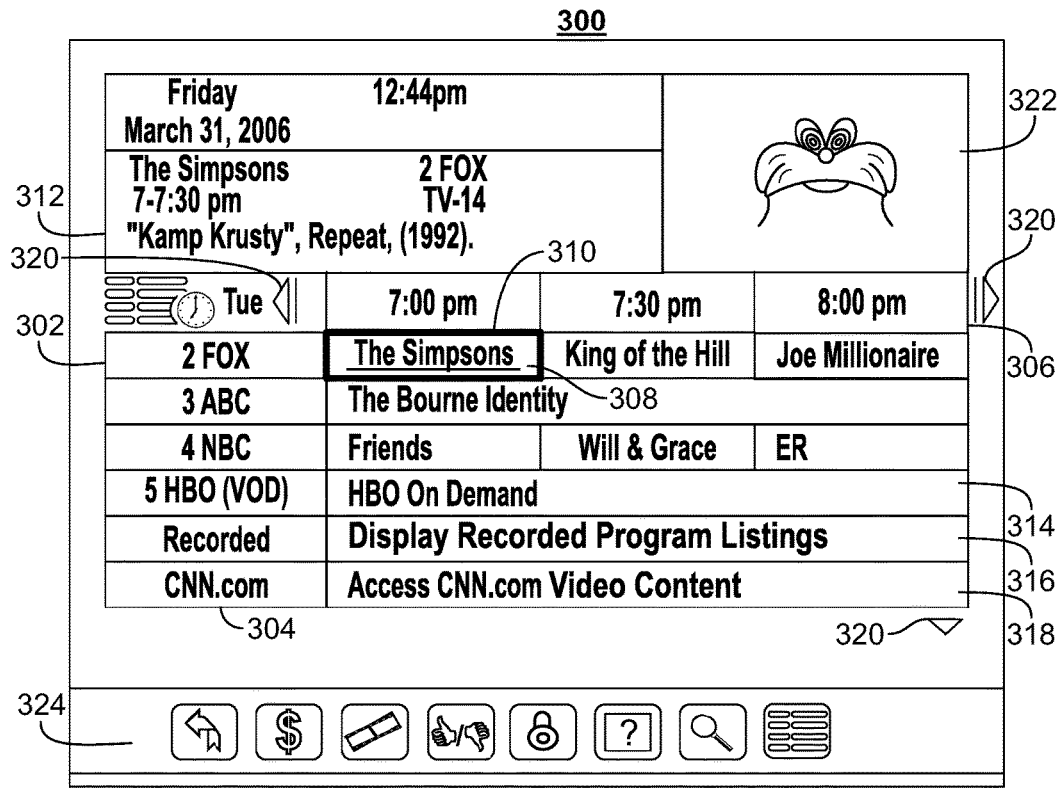
FIG. 3 shows an illustrative embodiment of a display screen that may be used to provide media guidance application listings and other media guidance information, in accordance with some embodiments of the disclosure.
Figure 4:
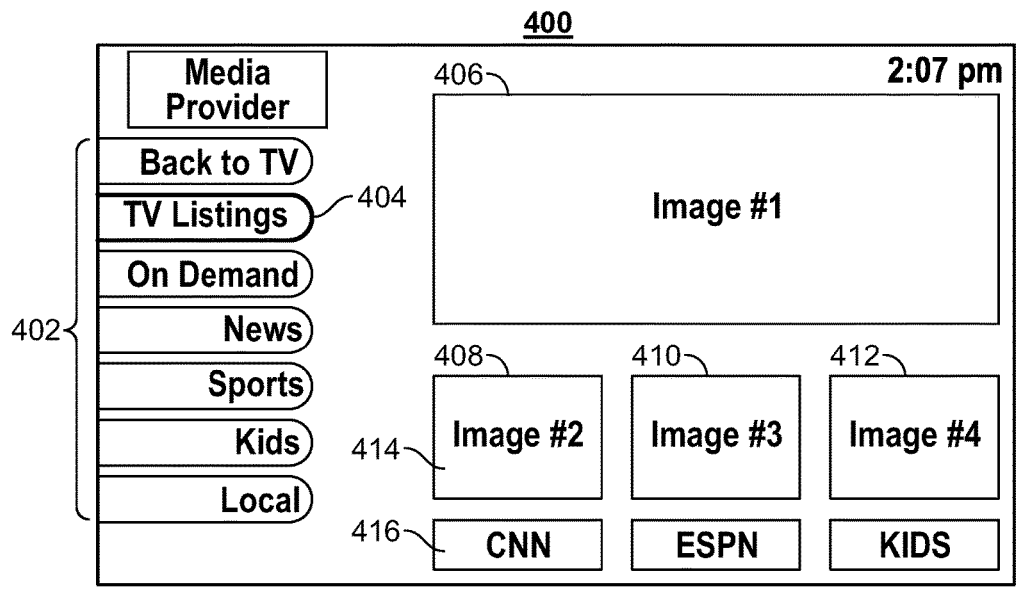
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform, e.g., user equipment 106 in FIG. 1. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 3003 and Yuen et al. U.S. Pat. No. 6,239,794, issued May 39, 3001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
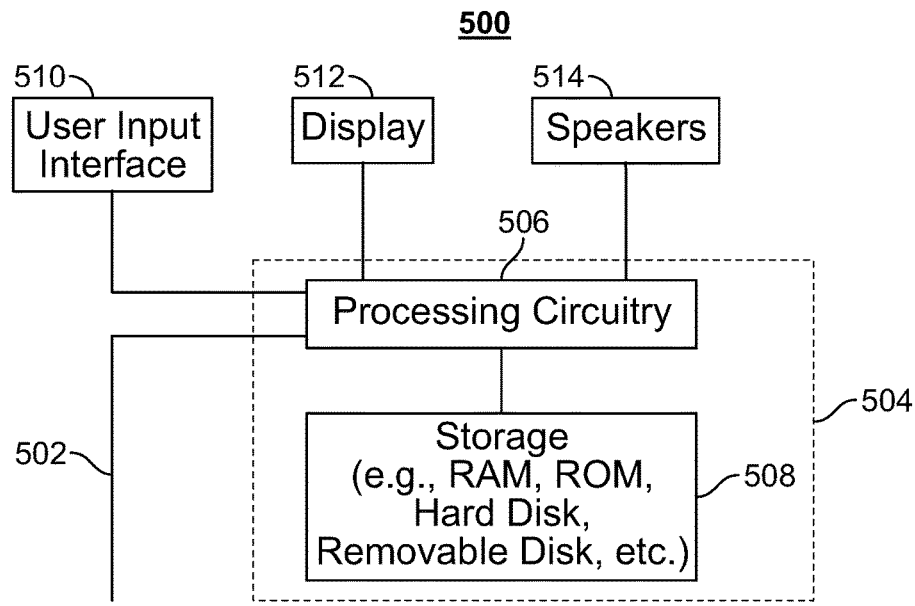
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 500 of FIG. 5 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

Figure 6:
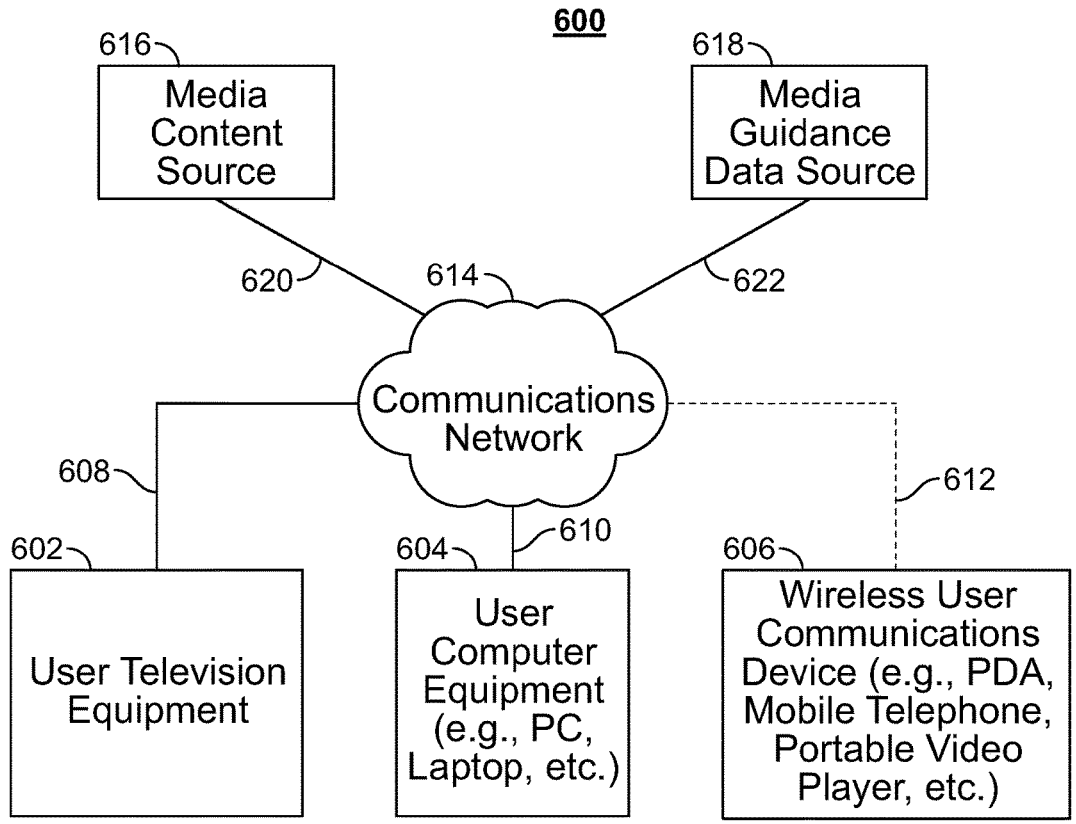
FIG. 6 is a block diagram of an illustrative media system in accordance with some embodiments of the disclosure.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 7:
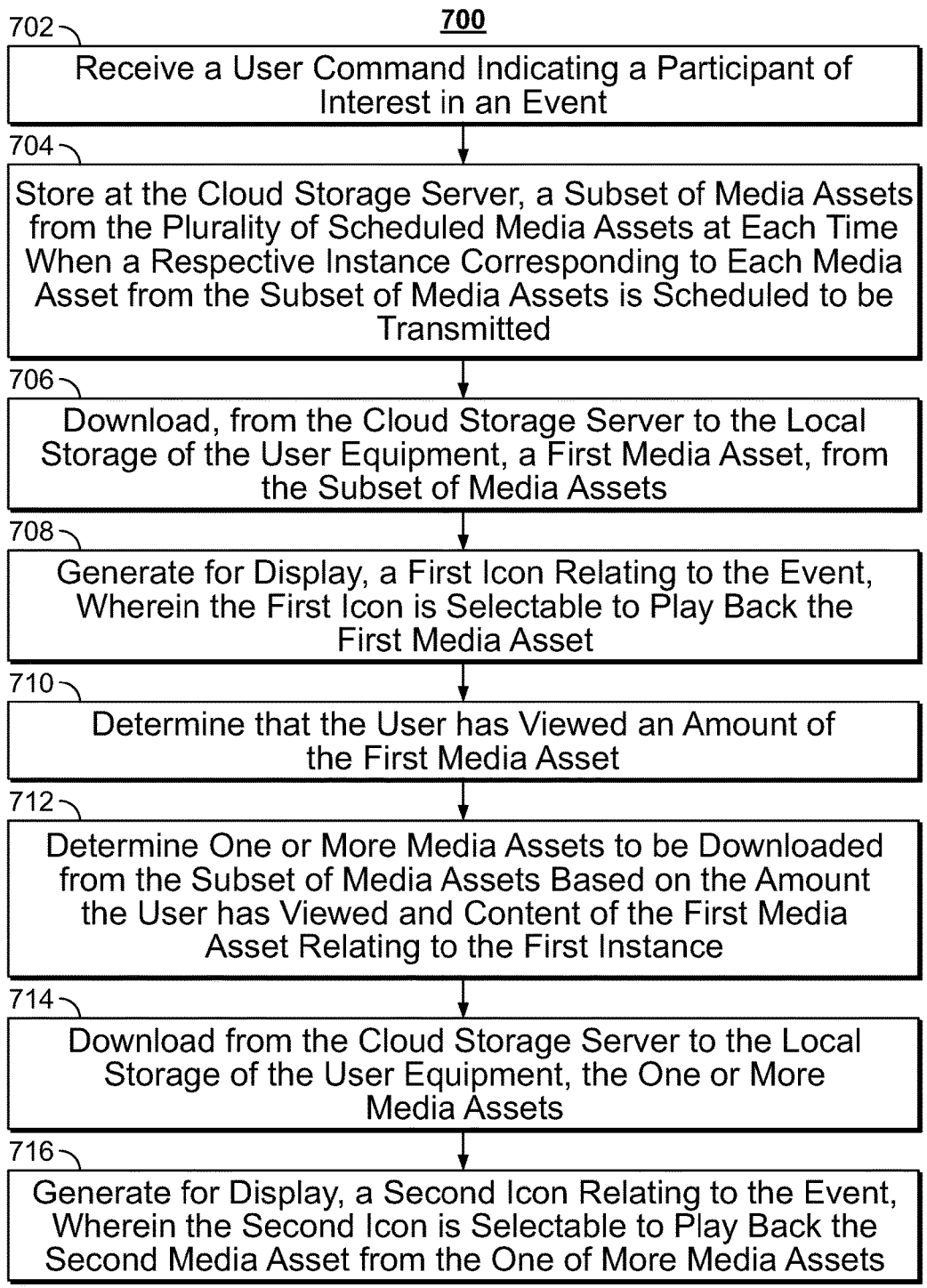
FIG. 7 depicts an illustrative flowchart of a process for automatically downloading one or more recorded media assets from a series of recorded media assets from a cloud storage server to a local storage unit at user equipment based on user viewing progress of the series of recorded media asset, in accordance with some embodiments of the disclosure.

FIG. 7 depicts an illustrative flowchart of a process for automatically downloading one or more recorded media assets from a series of recorded media assets from a cloud storage server to a local storage unit at user equipment based on user viewing progress of the series of recorded media asset, in accordance with some embodiments of the disclosure. Process 700 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 700 begins at 702, where control circuitry 504 receives a user command indicating a participant of interest in an event, e.g., see 115 in FIG. 1. For example, control circuitry 504 receives the user command upon user selection of a participant via user equipment (e.g., see 131 in FIG. 2). For another example, control circuitry receives the user command via a voice command (e.g., see 115 in FIG. 1). The event includes a plurality of scheduled media assets. At 704, control circuitry 504 stores, at the cloud storage server (e.g., see 120 in FIG. 1), a subset of media assets from the plurality of scheduled media assets at each time when a respective instance corresponding to each media asset from the subset of media assets is scheduled to be transmitted. At 706, control circuitry 504 downloads, from the cloud storage server (e.g., see 120 in FIG. 1, or data source 616 in FIG. 6) to the local storage of the user equipment (e.g., see 106, 110 in FIG. 1, or storage 508 in FIG. 5), a first media asset (e.g., see 118 in FIG. 1), from the subset of media assets. At 708, control circuitry 504 generates, for display (e.g., via the display 312 in FIG. 3, or any of 602, 604 and 606 in FIG. 6) a first icon relating to the event. For example, control circuitry 504 generates the first icon to link to the memory address at the local storage storing the first media asset, so that the first icon is selectable to play back the first media asset. At 710, control circuitry 504 determines that the user has viewed an amount of the first media asset. For example, control circuitry 504 monitors a point of progression corresponding to the media asset that is being played, and use the point pf progression to determine whether the user has viewed "enough" to understand an outcome of the media asset, as described in relation to FIG. 1. At 712, control circuitry 504 determines one or more media assets to be downloaded from the subset of media assets based on the amount the user has viewed and content of the first media asset relating to the first instance. For example, control circuitry 504 retrieves a program listing of the event, and forms a query on the program listing for a second instance subsequent to the first instance during evolvement of the event, e.g., a semi-final game in the World Cup series following a quarter-final game, etc. Control circuitry 504 then identifies the second media assets that corresponds to the second instance, e.g., based on the title, scheduled transmission time, subtitle, etc. of the second media asset. At 714, control circuitry 504 downloads, from the cloud storage server to the local storage of the user equipment, the one or more media assets (e.g., see 118 in FIG. 1). At 716, control circuitry 504 generates, for display (e.g., via the display 312 in FIG. 3, or any of 602, 604 and 606 in FIG. 6), a second icon relating to the event. For example, control circuitry 504 appends the memory address at the local storage storing the second media asset to the icon, so that when the icon is selected by the user, control circuitry 504 plays back the second media asset from the one of more media assets.

Figure 8:
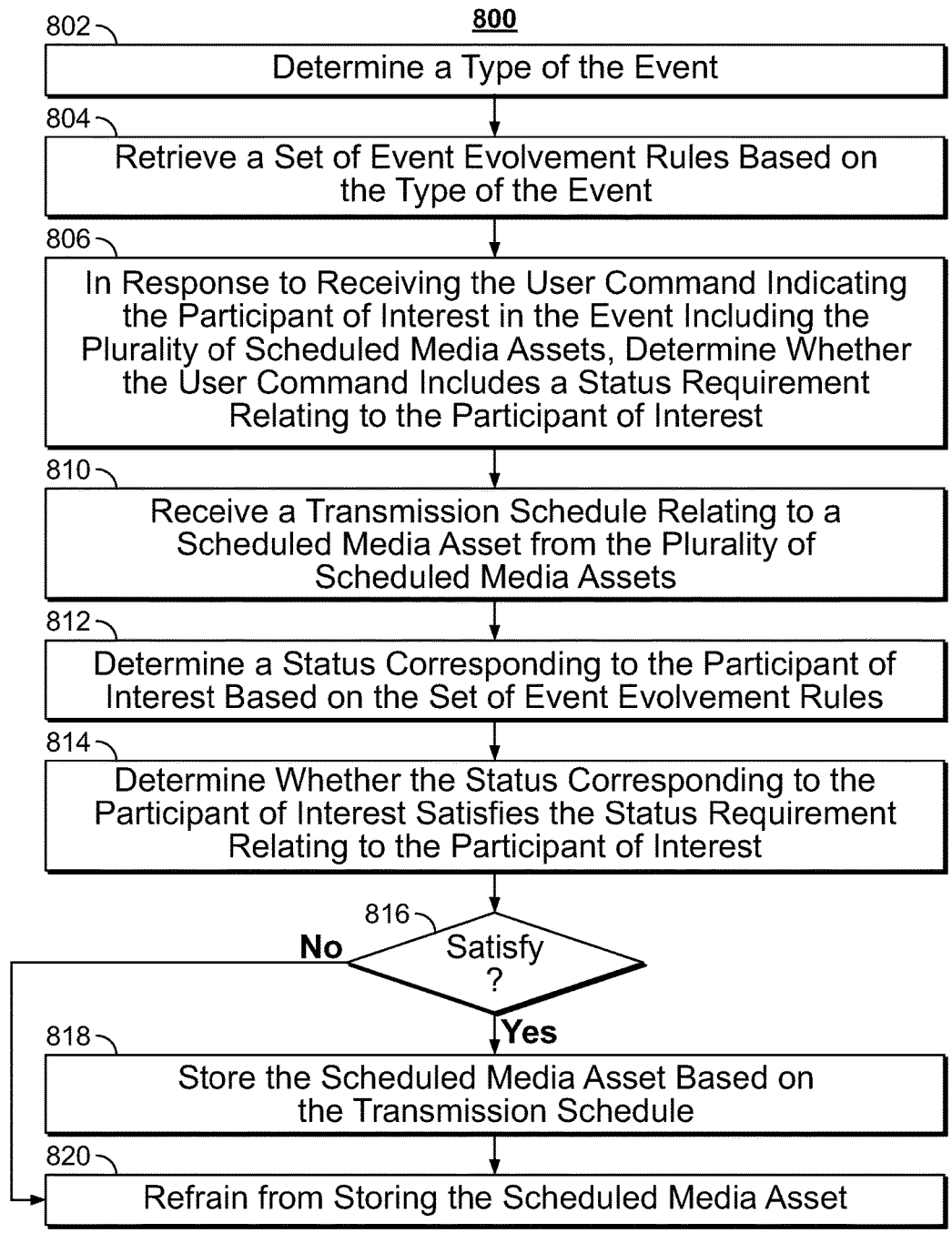
FIG. 8 depicts an illustrative flowchart of a process for storing a scheduled media asset in the event described in FIG. 7, in accordance with some embodiments of the disclosure.

FIG. 8 depicts an illustrative flowchart of a process for storing a scheduled media asset in the event described in FIG. 7, in accordance with some embodiments of the disclosure. Process 800 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 800 begins at 802, where control circuitry 504 determines a type of the event, e.g., a sports event, a reality television series, a television drama series, a news program, and/or the like. At 804, control circuitry 504 retrieves a set of event evolvement rules based on the type of the event. For example, control circuitry 504 forms a query on an event database, e.g., stored at local storage 508 in FIG. 5, or data source 618 in FIG. 6, based on the name of the event to retrieve the type of the event and the corresponding event evolvement rules. For instance, the event evolvement rules may include competition rules for a sports event, an outline of characters of a television drama series, and/or the like. At 806, in response to receiving the user command indicating the participant of interest in the event including the plurality of scheduled media assets (e.g., see 702 in FIG. 7), control circuitry 504 determines whether the user command includes a status requirement relating to the participant of interest. For example, control circuitry 504 parses a voice command to determine semantics of the keywords contained in the voice command, e.g., as described in relation to FIG. 1, the user command "track the games of the reigning champion" 115 includes a status requirement for the "reigning champion" to remain in the competition series.

At 810, in response to determining that the user command includes a status requirement relating to the participant of interest, control circuitry 504 receives a transmission schedule relating to a scheduled media asset from the plurality of scheduled media assets, e.g., a soccer game involving a participant of interest. At 812, control circuitry 504 determines a status corresponding to the participant of interest based on the set of event evolvement rules. For example, control circuitry 504 determines whether the participant of interest, e.g., a sports team or a television character that the user is interested in following, still remains in the event. At 814, control circuitry 504 determines whether the status corresponding to the participant of interest satisfies the status requirement relating to the participant of interest. For example, control circuitry 504 retrieves the status corresponding to the participant of interest, and compares against the status requirement obtained in the user command. For instance, when the status requirement requires that a television character is alive in the television drama, control circuitry 504 extracts information from the subtitle, the synopsis, user comments from the social media, etc., to determine whether the character is alive.

At 816, in response to determining that the status corresponding to the participant of interest satisfies the status requirement relating to the participant of interest, process 800 proceeds to 818, where control circuitry 504 stores the scheduled media asset based on the transmission schedule, e.g., at local storage of user equipment 106. At 816, in response to determining that the status corresponding to the participant of interest does not satisfy the status requirement relating to the participant of interest, process 800 proceeds to 820, where control circuitry 504 refrains from storing the scheduled media asset.

Figure 9:
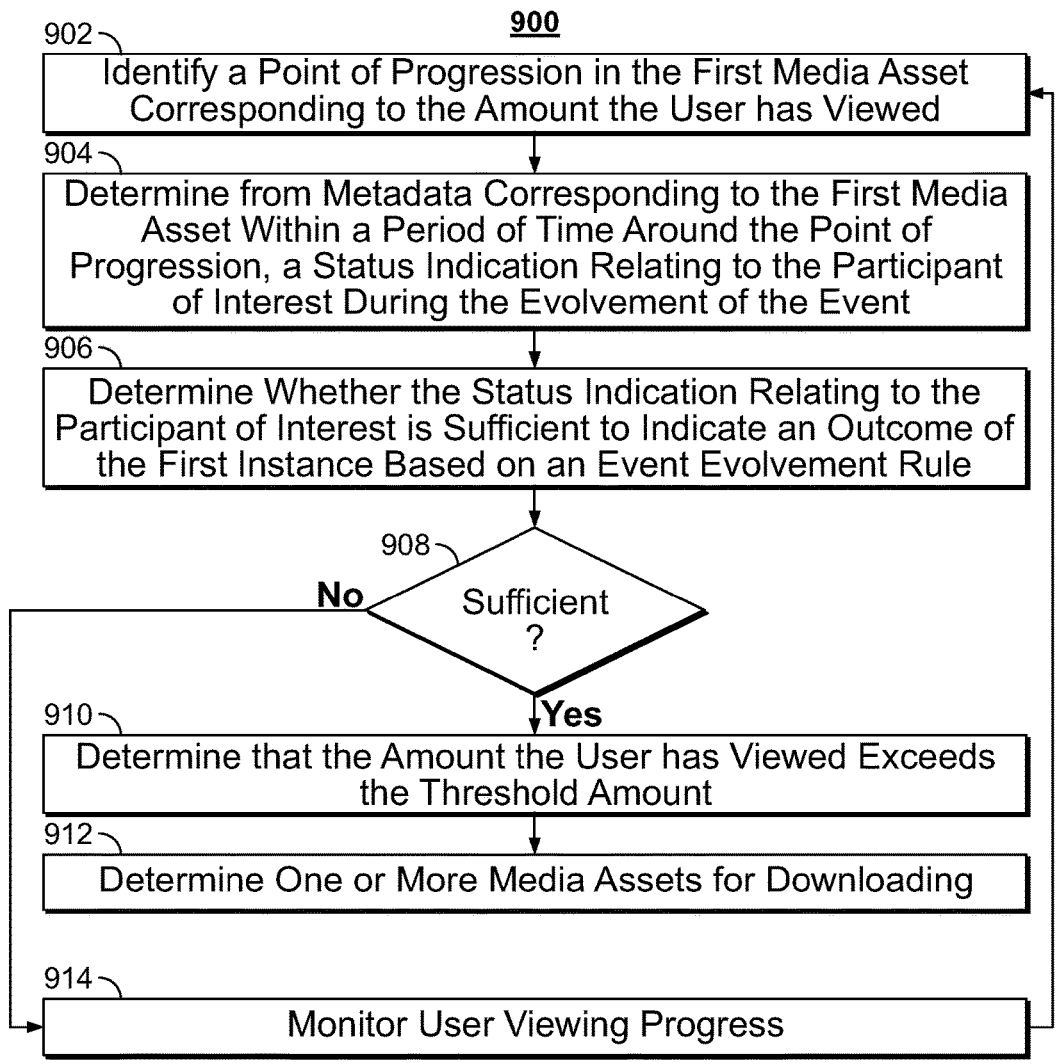
FIG. 9 depicts an illustrative flowchart of a process for determining that the user has viewed an amount of the media asset such that new media assets may be downloaded to the local storage as discussed in relation to FIG. 7, in accordance with some embodiments of the disclosure.

FIG. 9 depicts an illustrative flowchart of a process for determining that the user has viewed an amount of the media asset such that new media assets may be downloaded to the local storage (e.g., see 710 in FIG. 7), in accordance with some embodiments of the disclosure. Process 900 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 900 begins at 902, where control circuitry 504 identifies a point of progression in the first media asset corresponding to the amount the user has viewed, e.g., the user may have viewed 60%, 70%, etc. of the entire media asset. For example, control circuitry 504 monitors the point of progression when the first media asset is being played. For another example, control circuitry 504 retrieves the point of progression by reading a data field of the status information of the first media asset when the first media asset is not being played. At 904, control circuitry 504 determines, from metadata corresponding to the first media asset within a period of time around the point of progression, a status indication relating to the participant of interest during the evolvement of the event. For example, control circuitry 504 forms a query based on the participant of interest on the metadata (e.g., subtitle, user comments via social media, etc.), and parses the query results to obtain the status indication. For another example, as described in relation to FIG. 1, control circuitry 504 generates a screen image, and detects the status indication relating to the participant of interest, which is displayed at a certain position of the screen, e.g., the score of a sports game.

At 906, control circuitry 504 determines whether the status indication relating to the participant of interest is sufficient to indicate an outcome of the first instance based on an event evolvement rule. For example, when control circuitry 504 detects the status indication from a screen image, which includes a current score of a sports game as described above, the amount the user has watched may be sufficient to indicate the competition result of the current game. At 908, in response to determining that the status indication relating to the participant of interest is sufficient to indicate an outcome of the first instance based on an event evolvement rule, process 900 proceeds to 901, where control circuitry 504 determines that the amount the user has viewed exceeds the threshold amount. At 912, control circuitry 504 determines one or more media assets for downloading, e.g., see 712 in FIG. 7. Back to 908, in response to determining that the status indication relating to the participant of interest is insufficient to indicate an outcome of the first instance based on an event evolvement rule, process 900 proceeds to 914, where control circuitry 504 continue monitoring user viewing progress. Process 900 then proceeds from 914 to 902.

Figure 10:
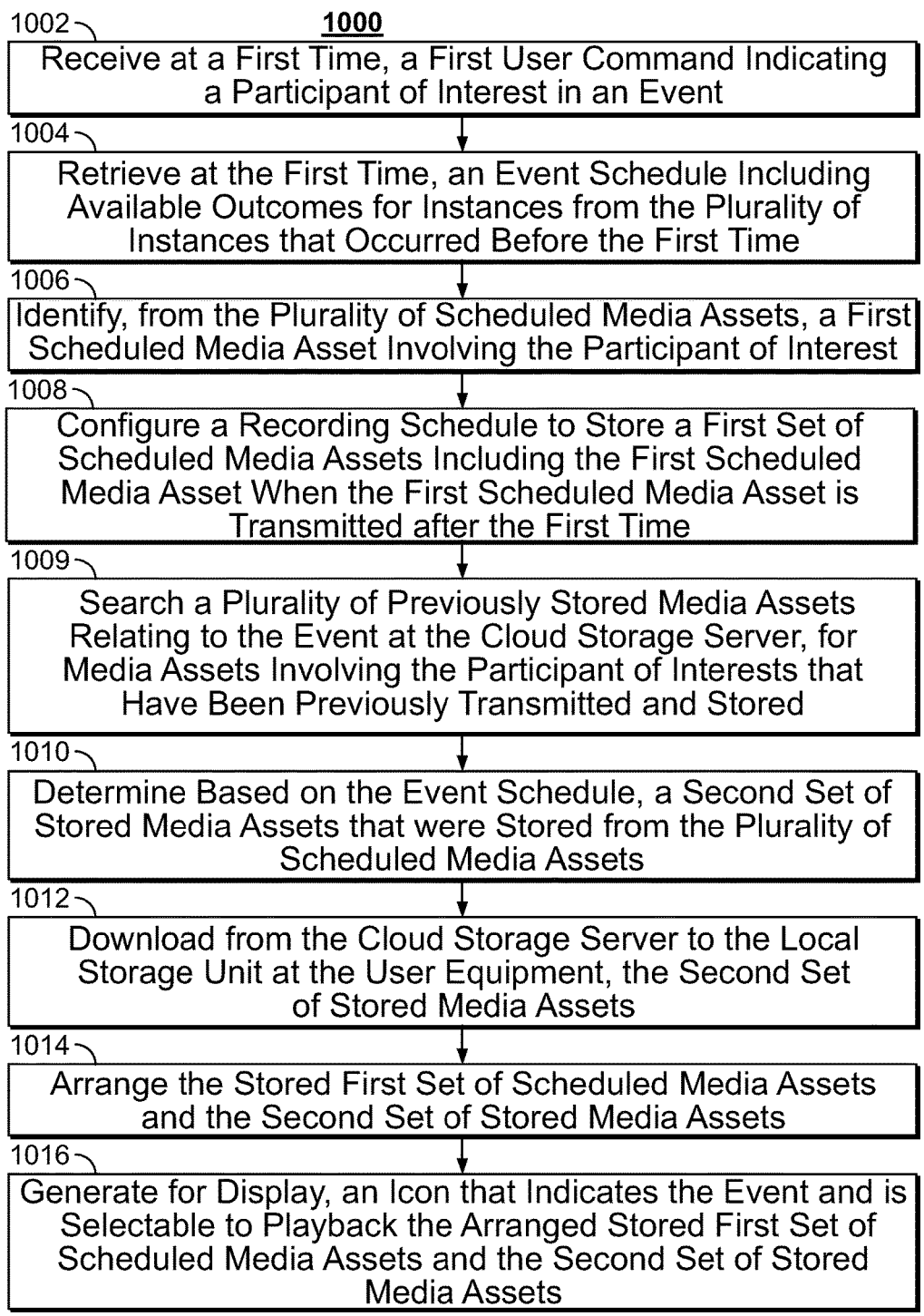
FIG. 10 depicts an illustrative flowchart of a process for adaptively retrieving and storing media assets relating to a participant of interest in an event in response to a user request received during the event, in accordance with some embodiments of the disclosure.

FIG. 10 depicts an illustrative flowchart of a process for adaptively retrieving and storing media assets relating to a participant of interest in an event in response to a user request received during the event, in accordance with some embodiments of the disclosure. Process 1000 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1000 begins at 1002, where control circuitry 504 receives, at a first time, a first user command indicating a participant of interest in an event, e.g., in a similar manner as described at 702 in FIG. 7. For example, the event (e.g., a sports event, a television drama series, etc.) includes a plurality of instances transmitted as a plurality of scheduled media assets. At 1004, control circuitry 504 identifies, from the plurality of scheduled media assets, a first scheduled media asset involving the participant of interest that is scheduled to transmit at a second time later than the first time. For example, control circuitry 504 forms a query, based on the participant of interest, on the media assets that are scheduled to transmit at a future time later than the first time when the user command was received, to obtain the first scheduled media asset in response to the query. At 1006, control circuitry 504 schedules the first scheduled media asset (e.g. the live game 122 in FIG. 2) for recording at the second time when the first scheduled media asset is scheduled to be transmitted after the first time. At 1008, control circuitry 504 searches a plurality of previously stored media assets relating to the event at the cloud storage server for media assets involving the participant of interest that have been previously transmitted and stored. For example, control circuitry 504 forms and transmits a query based on an event identifier and the participant to interest, and/or optionally subject to a start time of the event, on a database of previously stored media assets, e.g., see data source 616 in FIG. 6.

At 1010, control circuitry 504 retrieves, e.g., from data source 618 via communication network 614 in FIG. 6, outcomes for the set of plurality of instances. At 1012, control circuitry 504 determines, based on the retrieved outcomes, a second set of previously stored media assets (e.g., previously stored past games 121 in FIG. 2) from the plurality of previously stored media assets, and each previously stored media asset from the second set corresponds to a given one of the plurality of instances associated with an outcome that corresponds to a threshold. For example, control circuitry 504 transmits a query to a remote data source (e.g., cloud storage server 120 in FIGS. 1-2, data source 616 in FIG. 6) storing the plurality of media assets corresponding to the participant of interest for a subset of media assets subject to a condition that the instance corresponding to each media asset has a score greater than a pre-defined threshold, which indicates that the participant of interest is the winner of the respective instance. At 1014, control circuitry 504 downloads, from the cloud storage server (e.g., see 120 in FIG. 2) to the local storage unit at the user equipment (e.g., see 106 in FIG. 2), the second set of stored media assets (e.g., 121 in FIG. 2). At 1016, control circuitry 504 arranges the stored first set of scheduled media assets and the second set of previously stored media assets based on a respective transmission time corresponding to each respective media asset. For example, control circuitry 504 retrieves a transmission time from the metadata corresponding to each media asset, and sort the media assets in a chronological order. At 1018, control circuitry 504 may generate, for display (e.g., via the display 312 in FIG. 3, or any of 602, 604 and 606 in FIG. 6), an icon that indicates the event and is selectable to playback the arranged stored first set of scheduled media assets and the second set of stored media assets. For example, control circuitry 504 appends a link to a media asset that has the earliest transmission time among the arranged media assets to the icon so that when the icon is selected, control circuitry 504 plays back the earliest media asset, e.g., the user may watch the event from the earliest instance.

Figure 11:
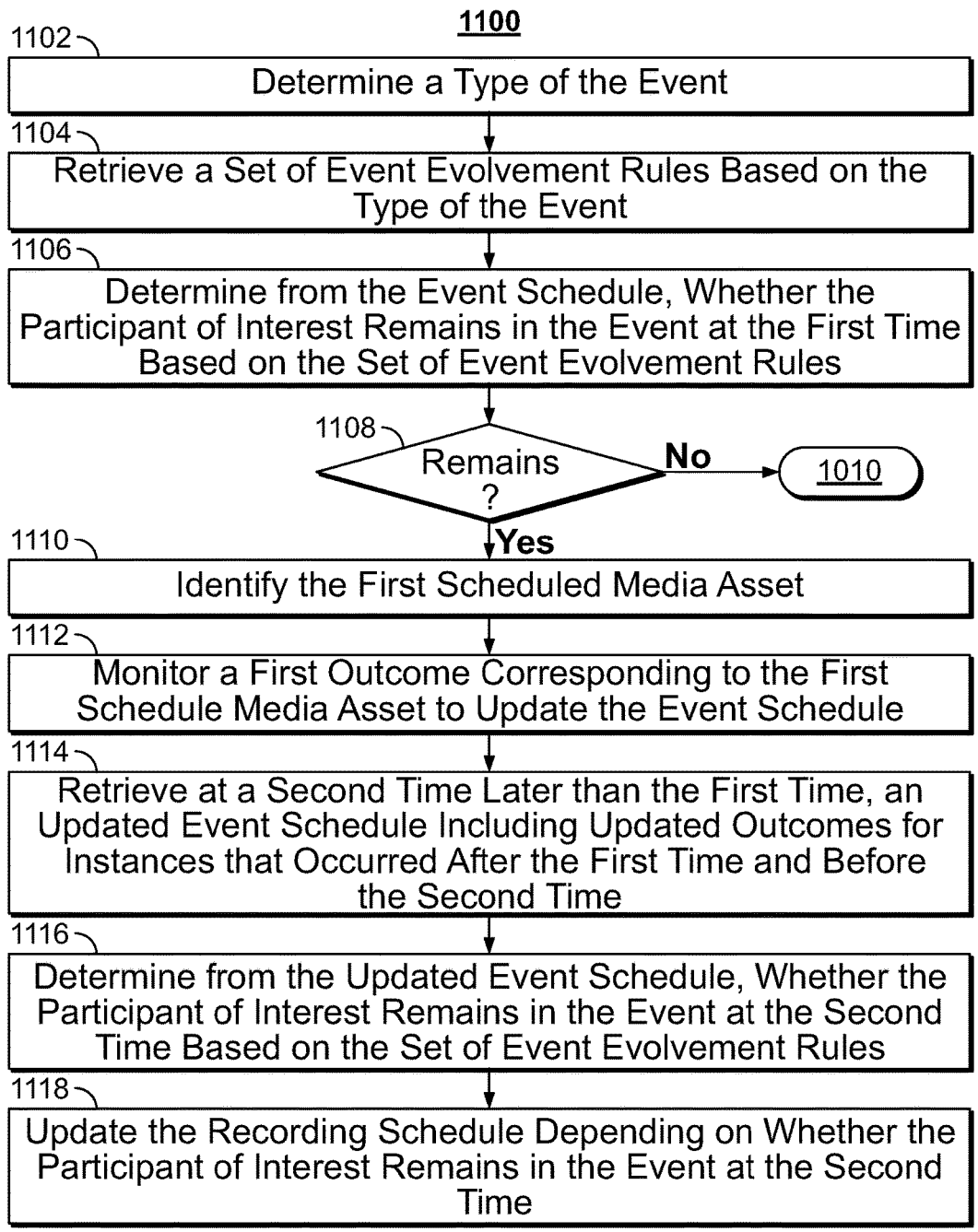
FIG. 11 depicts an illustrative flowchart of a process for identifying, from the plurality of scheduled media assets, a first scheduled media asset involving the participant of interest, in accordance with some embodiments of the disclosure.

FIG. 11 depicts an illustrative flowchart of a process for identifying, from the plurality of scheduled media assets, a first scheduled media asset involving the participant of interest (e.g., 1006 in FIG. 10), in accordance with some embodiments of the disclosure. Process 1100 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1100 begins at 1102, where control circuitry 504 determines a type of the event, e.g., a sports event, a television drama series, a reality television series, a news program, and/or the like. At 1104, control circuitry 504 retrieves a set of event evolvement rules based on the type of the event, similar to 804 in FIG. 8. The set of event evolvement rules indicate progression from a first instance to a second instance based on an outcome of the first instance during the event. At 1106, control circuitry 504 determines, from the event schedule, whether the participant of interest remains in the event at the first time based on the outcomes corresponding to instances that occurred before the first time and the set of event evolvement rules, e.g., in a similar manner as described in relation to 814 in FIG. 8. At 1108, in response to determining that the participant of interest remains in the event at the first time, process 1100 proceeds to 1110, where control circuitry 504 identifies the first scheduled media asset that is scheduled to transmit at the second time later than the first time when the user request was received. At 1108, in response to determining that the participant of interest does not remain in the event at the first time, process 1100 proceeds to 1010 in FIG. 10.

At 1112, control circuitry 504 monitors a first outcome corresponding to the first scheduled media asset to update the event schedule. For example, when the participant of interest loses in the first scheduled media asset, control circuitry 504 updates event schedule based on whether the participant of interest enters a next game, e.g., another game at the qualification stage, or round of 16, etc., and stores the updated event schedule at storage 508 in FIG. 5 or data source 618 in FIG. 6.

At 1114, control circuitry 504 retrieves, e.g., from storage 508 in FIG. 5 or data source 618 in FIG. 6, at a third time later than the first time but before the second time, updated outcomes for instances that occurred after the first time and before the second time. At 1116, control circuitry 504 determines, from the updated event schedule, whether the participant of interest remains in the event at the third time based on the set of event evolvement rules, e.g., in a similar manner as described in relation to 814 in FIG. 8. At 1118, control circuitry 504 updates the recording schedule depending on whether the participant of interest remains in the event at the third time, e.g., in a similar way as described in 1112.

Figure 12:
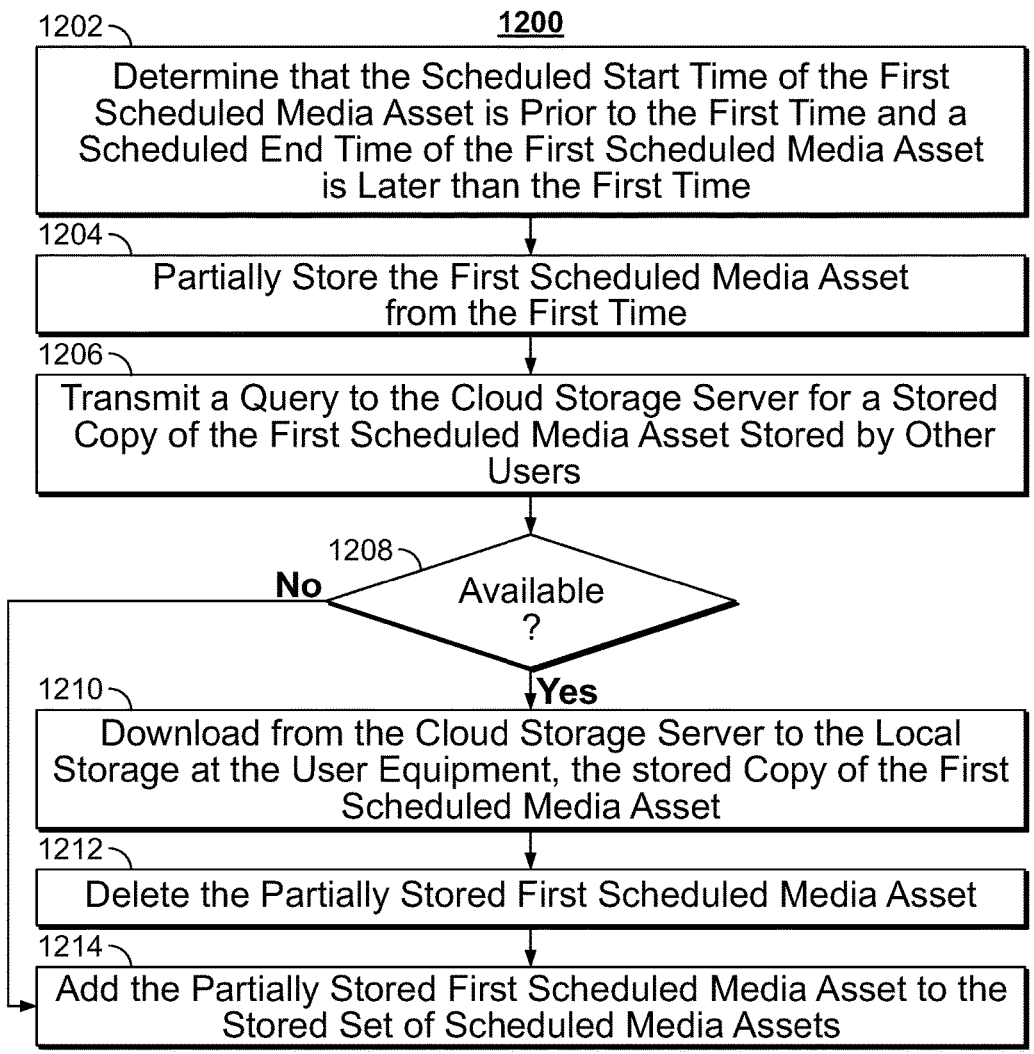
FIG. 12 depicts an illustrative flowchart of additional embodiments relating to identifying a first scheduled media asset involving the participant of interest, in accordance with some embodiments of the disclosure.

FIG. 12 depicts an illustrative flowchart of additional embodiments relating to identifying a first scheduled media asset involving the participant of interest (e.g., 1006 in FIG. 10), in accordance with some embodiments of the disclosure. Process 1100 may be executed by control circuitry 504 (e.g., in a manner instructed to control circuitry 504 by the media guidance application). Control circuitry 504 may be part of user equipment (e.g., user equipment 106, user television equipment 602, user computer equipment 604, and/or wireless communications device 606), or of a remote server separated from the user equipment by way of communications network 614.

Process 1200 begins at 1202, where control circuitry 504 determines that the scheduled start time of the first scheduled media asset is prior to the first time when the user command was received and a scheduled end time of the first scheduled media asset is later than the first time. For example, when the user command was received, control circuitry 504 forms a query on the event schedule for any scheduled media asset that has a scheduled start time before the first time and a scheduled end time later than the first time. The first scheduled media asset is being played or transmitted (e.g., from the television network 150 in FIG. 2. At 1204, control circuitry 504 partially records the first scheduled media asset from the first time. At 1206, control circuitry 504 transmits a query to a remote server, e.g., a cloud storage server (e.g., 120 in FIG. 2, or data source 616 in FIG. 6) for a stored copy of the first scheduled media asset stored by other users.

At 1208, in response to determining that a stored copy of the first scheduled media asset stored by other users is available, process 1200 proceeds to 1210, where control circuitry 504 downloads from the remote server, e.g., the cloud storage server (e.g., 120 in FIG. 2) to the local storage device at the user equipment (e.g., 106 in FIG. 2), the stored copy of the first scheduled media asset. At 1212, control circuitry 504 deletes the partially recorded first scheduled media asset. At 1208, in response to determining that a stored copy of the first scheduled media asset stored by other users is unavailable, process 1200 proceeds to 1214, where control circuitry 504 adds the partially recorded first scheduled media asset to the stored set of scheduled media assets.

It should be noted that processes 700-1200 or any step thereof could be performed on, or provided by, any of the devices shown in, or described with respect to, FIGS. 1 and 5-6. For example, any of processes 700-1200 may be executed by control circuitry 504 (FIG. 5) as instructed by control circuitry implemented on user equipment 106 (FIG. 1), 602, 604, 606 (FIG. 6), and/or the like for generating and displaying a summary view of a media asset. In addition, one or more steps of processes 700-1200 may be incorporated into or combined with one or more steps of any other process or embodiment.

It is contemplated that the actions or descriptions of each of FIGS. 7-12 may be used with any other embodiment of this disclosure. In addition, the actions and descriptions described in relation to FIGS. 7-12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1 and 5-6 could be used to perform one or more of the actions in FIGS. 7-12.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a status indication relating to a participant of interest, e.g., by processing circuitry 506 of FIG. 5. The processing circuitry, for instance, may be a general purpose processor, a customized integrated circuit (e.g., an ASIC), or a field-programmable gate array (FPGA) within user equipment 500, media content source 616, or media guidance data source 618. For example, the predefined hierarchical structure, may be stored in, and retrieved from, storage 508 of FIG. 5, or media guidance data source 618 of FIG. 6. Furthermore, processing circuitry, or a computer program, may update configuration data of the media guidance application, which may be stored within storage 508 of FIG. 5 or media guidance data source 618 of FIG. 6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for adaptively retrieving and storing media assets relating to a participant of interest in an event in response to a user request received during the event, the method comprising:
  receiving, at a first time, a first user command indicating a participant of interest in an event, wherein the event includes a plurality of instances transmitted as a plurality of scheduled media assets;
  identifying, from the plurality of scheduled media assets, a first scheduled media asset involving the participant of interest that is scheduled for transmission at a second time later than the first time;
  scheduling the first scheduled media asset for recording at the second time;
  searching, a remote server, for a first set of previously stored media assets that involve the participant of interest and that correspond to a set of the plurality of instances that were transmitted as a set of the plurality of scheduled media assets before the first time;
  retrieving outcomes for the set of the plurality of instances;
  determining, based on the retrieved outcomes, a second set of previously stored media assets from the first set of previously stored media assets, each previously stored media asset in the second set corresponds to a given one of the plurality of instances associated with an outcome that corresponds to a threshold;
  downloading, at the first time, from the remote server to a local storage device at a user device, the second set of previously stored media assets;
  arranging the recorded first scheduled media asset and the downloaded second set of previously stored media assets based on a respective transmission time corresponding to each respective media asset;
  generating, for display, the arranged media assets in a sequence;
  retrieving, at a third time later than the first time and before the second time, updated outcomes for instances that occurred after the first time and before the second time;
  determining whether the participant of interest remains in the event at the third time based on the updated outcomes and a set of event evolution rules; and
  updating a recording schedule depending on whether the participant of interest remains in the event at the third time.

2. The method of claim 1, further comprising:
  in response to receiving the first user command, extracting a descriptor from the user command indicating the participant of interest;
  determining whether the descriptor identifies a name for the participant of interest; and
  in response to determining that the descriptor does not identify the name for the participant of interest, transmitting a query based on the descriptor to a database storing data relating to the event; and
  in response to the query, obtaining an identifier for the participant of interest.

3. The method of claim 1, wherein the identifying, from the plurality of scheduled media assets, a first scheduled media asset involving the participant of interest that is scheduled for transmission at a second time later than the first time comprises:
  determining a type of the event;
  retrieving the set of event evolvement rules based on the type of the event, wherein the set of event evolvement rules indicate progression from a first instance to a second instance from the plurality of instances based on an outcome of the first instance during the event;
  determining, from the event schedule, whether the participant of interest remains in the event at the first time based on the outcomes for the set of the plurality of instances and the set of event evolvement rules; and
  in response to determining that the participant of interest remains in the event at the first time:
  identifying the first scheduled media asset that involves the participant of interest and is scheduled to be transmitted at the second time later than the first time.

4. The method of claim 3, further comprising:
  in response to determining that the participant of interest no longer remains in the event at the first time, determining, from the event schedule, a second scheduled media asset from the plurality of scheduled media assets and a percentage of users who are recording one or more scheduled media assets and has chosen to record the second scheduled media asset;
  determining whether the percentage exceeds a popularity threshold; and
  in response to determining that the percentage exceeds the popularity threshold, scheduling for recording the second scheduled media asset when the second scheduled media asset is scheduled to be transmitted.

5. The method of claim 4, further comprising:
  recording the second scheduled media asset based on the scheduling;
  determining that a period of time has lapsed after the second scheduled media asset has been stored;
  determining whether a stored copy of the second scheduled media asset has not been selected by the user;
  in response to determining that the stored copy of the second scheduled media asset has not been selected by the user for the period of time, deleting the stored copy of the second scheduled media asset from the local storage at the user equipment; and
  generating, for display, a visual element corresponding to the second scheduled media asset and indicating that the second scheduled media asset has been deleted from the local storage at the user equipment.

6. The method of claim 3, further comprising:
  determining that a scheduled start time of the first scheduled media asset is prior to the first time and a scheduled end time of the first scheduled media asset is later than the first time;
  partially recording the first scheduled media asset from the first time;
  transmitting a query to the remote server for a stored copy of the first scheduled media asset stored by other users; and
  in response to determining that the stored copy of the first scheduled media asset is available at the remote server:

downloading, from the remote server to the local storage device at the user equipment, the stored copy of the first scheduled media asset; and deleting the partially stored first scheduled media asset.

7. The method of claim 1, wherein the downloading, at the first time, from the remote server to a local storage device at a user device, the second set of previously stored media assets, comprises:

downloading, from the remote server to the local storage device of the user equipment, a first previously stored media asset from the second set of previously stored media assets;

determining whether an amount of the first previously stored media asset that the user has viewed exceeds a threshold amount of the first media asset;

in response to determining that the amount of the first previously stored media asset that the user has viewed exceeds the threshold amount of the first media asset, determining one or more previously stored media assets from the second set of previously stored media assets, wherein the one or more previously stored media assets were stored subsequent to the first stored media asset; and downloading, from the remote server and at the local storage device of user equipment, the one or more stored media assets.

8. The method of claim 7, further comprising:

receiving a second user command to skip or fast forward the first previously stored media asset;

determining, from the second set of stored media assets, whether there is a second previously stored media asset that has not been downloaded;

in response to determining that there is a second previously stored media asset that has not been downloaded, starting downloading the one or more previously stored media assets; and in response to determining that there is no other previously stored media asset that has not been downloaded from the second set of previously stored media assets, generating, for display, a stored copy of the first scheduled media asset.

9. The method of claim 1, further comprising:

determining, from a data source, that a first period of time has lapsed since the event is finished;

determining whether any media asset from the arranged stored first set of scheduled media assets and the second set of previously stored media assets has been played during a past second period of time;

in response to determining that no media asset from the arranged stored first set of scheduled media assets and the second set of previously stored media assets has been played during the past second period of time, deleting, in a batch, all media assets that belong to the arranged stored first set of scheduled media assets and the second set of previously stored media assets from the local storage device at the user equipment; and generating, for display, a visual element corresponding to the event and indicating that the event has been deleted from the local storage device at the user equipment.

10. A system for adaptively retrieving and storing media assets relating to a participant of interest in an event in response to a user request received during the event, the system comprising:

communication circuitry;
input/output (I/O) interface circuitry; and
control circuitry configured to:

receive, at a first time, a first user command indicating a participant of interest in an event, wherein the event includes a plurality of instances transmitted as a plurality of scheduled media assets;

identify, from the plurality of scheduled media assets, a first scheduled media asset involving the participant of interest that is scheduled for transmission at a second time later than the first time;

schedule the first scheduled media asset for recording at the second time;

search, a remote server, for a first set of previously stored media assets that involve the participant of interest and that correspond to a set of the plurality of instances that were transmitted as a set of the plurality of scheduled media assets before the first time;

retrieve outcomes for the set of the plurality of instances;

determine, based on the retrieved outcomes, a second set of previously stored media assets from the first set of previously stored media assets, each previously stored media asset in the second set corresponds to a given one of the plurality of instances associated with an outcome that corresponds to a threshold;

download, at the first time, from the remote server to a local storage device at a user device, the second set of previously stored media assets;

arrange the recorded first scheduled media asset and the downloaded second set of previously stored media assets based on a respective transmission time corresponding to each respective media asset;

generate, for display, the arranged media assets in a sequence;

retrieve, at a third time later than the first time and before the second time, updated outcomes for instances that occurred after the first time and before the second time;

determine whether the participant of interest remains in the event at the third time based on the updated outcomes and the set of event evolvement rules; and update a recording schedule depending on whether the participant of interest remains in the event at the third time.

11. The system of claim 10, wherein the control circuitry is further configured to:

in response to receiving the first user command, extract a descriptor from the user command indicating the participant of interest;

determine whether the descriptor identifies a name for the participant of interest; and in response to determining that the descriptor does not identify the name for the participant of interest, transmit a query based on the descriptor to a database storing data relating to the event; and in response to the query, obtain an identifier for the participant of interest.

12. The system of claim 10, wherein the control circuitry, when identifying, from the plurality of scheduled media assets, a first scheduled media asset involving the participant of interest that is scheduled for transmission at a second time later than the first time, is further configured to:

determine a type of the event;

retrieve the set of event evolvement rules based on the type of the event, wherein the set of event evolvement rules indicate progression from a first instance to a second instance based on an outcome of the first instance during the event;

determine, from the event schedule, whether the participant of interest remains in the event at the first time based on the outcomes for the set of the plurality of instances and the set of event evolvement rules; and in response to determining that the participant of interest remains in the event at the first time:

identify the first scheduled media asset that involves the participant of interest and is scheduled to be transmitted at the second time later than the first time.

13. The system of claim 12, wherein the control circuitry is further configured to:

in response to determining that the participant of interest no longer remains in the event at the first time, determine, from the event schedule, a second scheduled media asset from the plurality of scheduled media assets and a percentage of users who are recording one or more scheduled media assets and has chosen to record the second scheduled media asset;

determine whether the percentage exceeds a popularity threshold; and in response to determining that the percentage exceeds the popularity threshold, schedule for recording the second scheduled media asset when the second scheduled media asset is scheduled to be transmitted.

14. The system of claim 13, wherein the control circuitry is further configured to:

record the second scheduled media asset based on the scheduling;

determine that a period of time has lapsed after the second scheduled media asset has been stored;

determine whether a stored copy of the second scheduled media asset has not been selected by the user;

in response to determining that the stored copy of the second scheduled media asset has not been selected by the user for the period of time, delete the stored copy of the second scheduled media asset from the local storage at the user equipment; and generate, for display, a visual element corresponding to the second scheduled media asset and indicating that the second scheduled media asset has been deleted from the local storage at the user equipment.

15. The system of claim 12, wherein the control circuitry is further configured to:

determine that a scheduled start time of the first scheduled media asset is prior to the first time and a scheduled end time of the first scheduled media asset is later than the first time;

partially record the first scheduled media asset from the first time;

transmit a query to the remote server for a stored copy of the first scheduled media asset stored by other users; and in response to determining that the stored copy of the first scheduled media asset is available at the cloud storage server:

download, from the remote server to the local storage device at the user equipment, the stored copy of the first scheduled media asset; and delete the partially stored first scheduled media asset.

16. The system of claim 10, wherein the control circuitry, when downloading, at the first time, from the remote server to a local storage device at a user device, the second set of previously stored media assets, is configured to:

download, from the remote server to the local storage device of the user equipment, a first previously stored media asset from the second set of previously stored media assets;

determine whether an amount of the first previously stored media asset that the user has viewed exceeds a threshold amount of the first media asset;

in response to determining that the amount of the first stored media asset that the user has viewed exceeds the threshold amount of the first media asset, determine one or more previously stored media assets from the second set of previously stored media assets, wherein the one or more previously stored media assets were previously stored subsequent to the first stored media asset; and download, from the remote server and at the local storage of user equipment, the one or more previously stored media assets.

17. The system of claim 16, wherein the control circuitry is further configured to:

receive a second user command to skip or fast forward the first previously stored media asset;

determine, from the second set of stored media assets, whether there is a second previously stored media asset that has not been downloaded;

in response to determining that there is a second previously stored media asset that has not been downloaded, start downloading the one or more stored media assets; and in response to determining that there is no other previously stored media asset that has not been downloaded from the second set of previously stored media assets, generate, for display, a stored copy of the first scheduled media asset.

18. The system of claim 10, wherein the control circuitry is further configured to:

determine, from a data source, that a first period of time has lapsed since the event is finished;

determine whether any media asset from the arranged previously stored first set of scheduled media assets and the second set of stored media assets has been played during a past second period of time;

in response to determining that no media asset from the arranged stored first set of scheduled media assets and the second set of previously stored media assets has been played during the past second period of time, delete, in a batch, all media assets that belong to the arranged stored first set of scheduled media assets and the second set of previously stored media assets from the local storage device at the user equipment; and generate, for display, a visual element corresponding to the event and indicating that the event has been deleted from the local storage at the user equipment.

* * * * *